May 24, 1938.  T. M. BUTLER  2,118,588
CALCULATING MACHINE
Filed Jan. 11, 1932   12 Sheets—Sheet 1

INVENTOR
Thomas M. Butler
BY
Rector, Hibben, Davis, & Macauley
ATTORNEYS

May 24, 1938.　　　T. M. BUTLER　　　2,118,588
CALCULATING MACHINE
Filed Jan. 11, 1932　　12 Sheets-Sheet 5

INVENTOR
Thomas M. Butler
BY
Reese, Hibben, Davis, & Macauley
ATTORNEYS

May 24, 1938.  T. M. BUTLER  2,118,588
CALCULATING MACHINE
Filed Jan. 11, 1932      12 Sheets-Sheet 6

INVENTOR
Thomas M. Butler
BY
ATTORNEYS

May 24, 1938.　　　　T. M. BUTLER　　　　2,118,588
CALCULATING MACHINE
Filed Jan. 11, 1932　　　12 Sheets-Sheet 7

INVENTOR
Thomas M. Butler
BY
Rector, Hibben, Davis & Macauley
ATTORNEYS

May 24, 1938.  T. M. BUTLER  2,118,588
CALCULATING MACHINE
Filed Jan. 11, 1932  12 Sheets-Sheet 10

INVENTOR
Thomas M. Butler
BY
ATTORNEYS

May 24, 1938.   T. M. BUTLER   2,118,588
CALCULATING MACHINE
Filed Jan. 11, 1932   12 Sheets-Sheet 11

Fig.15.

INVENTOR
Thomas M. Butler
BY
Rector, Hibben, Davis, & Macauley
ATTORNEYS

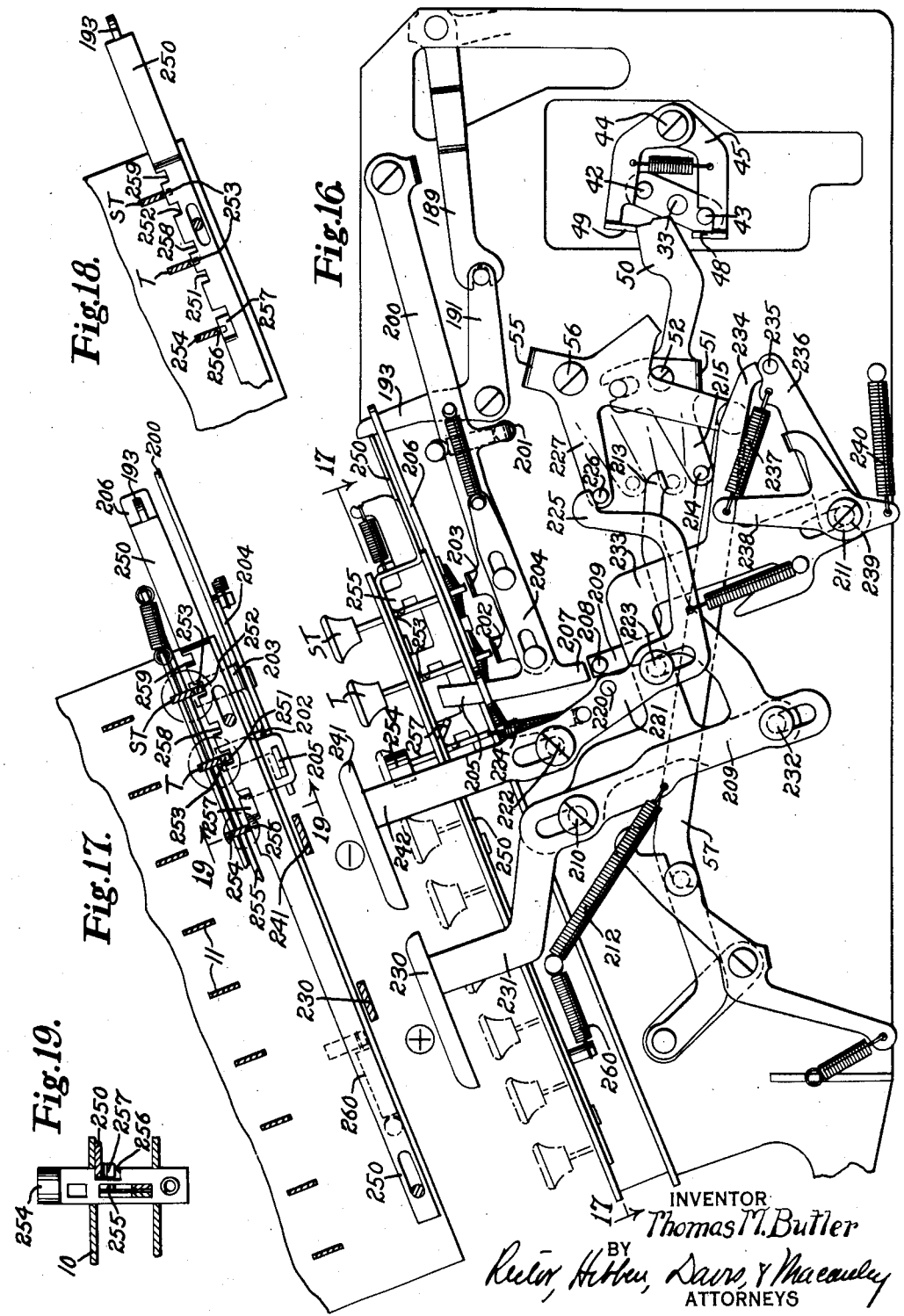

Patented May 24, 1938

2,118,588

UNITED STATES PATENT OFFICE 2,118,588

CALCULATING MACHINE

Thomas M. Butler, Detroit, Mich., assignor to Burroughs Adding Machine Company, Detroit, Mich., a corporation of Michigan Application January 11, 1932, Serial No. 585,940

27 Claims. (Cl. 235—60)

This invention relates to a calculating machine. It relates particularly to a machine by means of which both addition and subtraction can be performed more simply and quickly than heretofore possible. Also to a construction for enabling both positive totals and true negative totals to be very simply and quickly taken without the necessity of giving the machine a spacing stroke or strokes.

Most calculating machines that are capable of both addition and subtraction require that a lever be manipulated or a subtract key depressed and the machine given one or more spacing strokes to condition it for subtraction. This requires careful attention to business by the operator and consumes time. The present invention, in one of its aspects, is directed to the provision of a machine that will not require the manipulation of a lever or the depression of a subtraction key nor will it require any spacing strokes. All that the operator need do is to enter the item on the amount keys and depress either a "subtract" (—) or an "add" (+) motor bar, whereupon the item will be optionally subtracted or added by a single stroke of operation of the machine.

Most calculating machines also require that the machine be given one or more spacing strokes before a total can be taken, and the total key is usually locked to prevent its operation until after the required number of spacing strokes have been given the machine. These strokes are necessary in order to restore the transfer mechanism prior to the taking of a total and, sometimes, also, in order to put the machine in addition or subtraction condition depending upon the positive or negative character of the total in the register. For example, in the Burroughs machine, as shown in Rinsche Patent No. 1,179,564, a tumbling type of addition-subtraction register is used. If the last item entered is a subtract item, the register is in subtract condition. The first spacing stroke rocks the tumbling register to addition position and restores the transfer pawls and latches that may have been tripped. But the tumbling of the registers also inserts a "fugitive 1", as described in Rinsche 1,172,484, which action may trip the transfer mechanism so that a second stroke is necessary in order to be sure that all the transfer pawls and latches have been restored before a total is taken. Machines have been developed that do not require a spacing stroke in the taking of a positive total but these machines require a spacing stroke or some special manipulation when a true negative total is to be taken. It is highly desirable to be able to take either a positive or a true negative total without any special manipulation or operation of the machine and the present invention has been devised with this end in view.

Accordingly, the invention may be said to have for its general objects:

The provision of a calculating machine by means of which addition or subtraction may be more simply and quickly performed;

The provision of a calculating machine by means of which both positive totals and true negative totals may be more simply and quickly obtained.

Other and more particular objects are:

To provide a machine that will automatically condition the register for addition or subtraction as the machine starts to operate without requiring a spacing stroke.

To provide an improved machine by means of which addition or subtraction may be performed by simply depressing an "add" or a "subtract" motor bar.

To provide an improved machine that will enable either positive or true negative totals to be taken by merely depressing the total key and operating the machine through a single operation.

To provide a machine that will automatically insert the "fugitive 1" when the register goes from positive to negative condition and vice versa without inserting said "fugitive 1" when the capacity of the register is exceeded either positively or negatively.

Other objects and advantages of the invention will appear from the following specification and drawings.

An embodiment of the invention is shown in the accompanying drawings in which:

Fig. 15 is a right side elevation of the controls causing the machine to automatically operate by depression of the total key to take a positive or a negative total depending upon the character of the total in the registering mechanism.

Fig. 16 is a right side elevation of the controls for conditioning the machine to add or subtract by depression of an "add" (+) or a "subtract" (−) motor bar.

Fig. 17 is a sectional plan view on the line 17—17 of Fig. 16 showing the locking slide for the total and sub-total keys in position to permit depression of these keys.

Fig. 18 is a fragmentary view similar to Fig. 17, but showing the total and subtotal keys locked when there is a negative total in the machine.

Fig. 19 is a section on the line 19—19 of Fig. 17 looking in the direction of the arrows.

The invention is shown applied to a Burroughs portable machine which is on the market and the general features of which are well known. Only such portions of the machine as are associated directly with the present invention will be described in detail, reference being made to Patent No. 1,853,050 for details.

It is to be understood, of course, that the invention can be incorporated in machines of other types.

*General calculating machine features*

The machine is provided with a keyboard 10 having a plurality of banks of depressible amount keys 11, there usually being nine banks of nine keys each. The keyboard is also provided with a bank of control keys comprising a total key T, a sub-total key ST, a non-add key NA, a repeat key R and an error key E. The machine also has a subtract lever 12 for conditioning the machine for addition or subtraction. This lever normally occupies the full line position shown in Fig. 1 which is the "add" position, but it may be moved to the dot and dash or "subtract" position when desired.

Figures 1, 2:
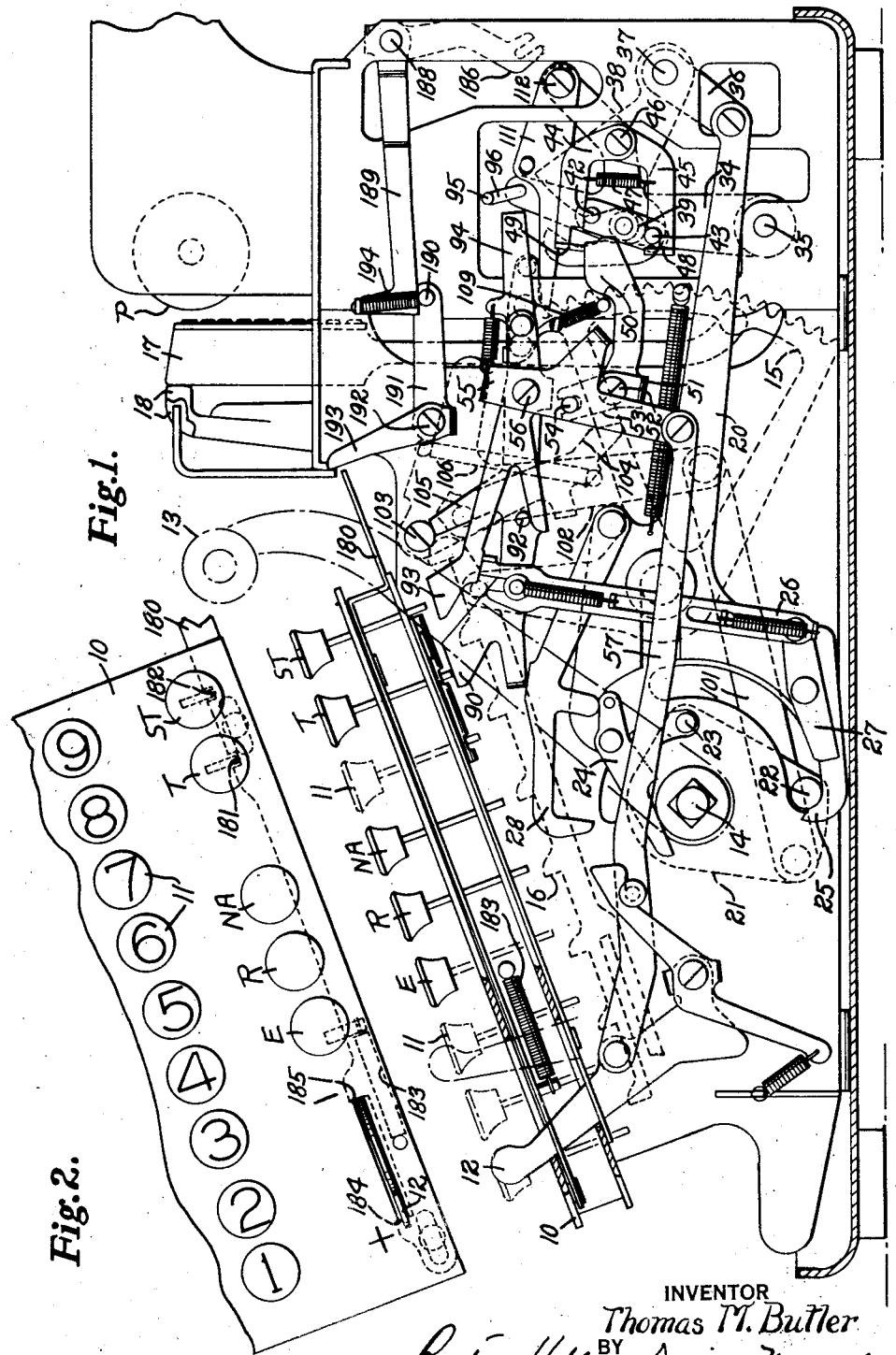
Figure 1 is a right side elevation of the machine with the casing removed showing the parts in normal condition.
Fig. 2 is a partial plan view of the keyboard of the machine.

The machine may be either hand operated or motor-driven, the machine shown in Fig. 1 being operated by the handle 13. When the machine is operated, a main drive shaft 14 is first rocked counterclockwise to give the machine a "forward" stroke of operation after which it returns clockwise to its original position, the latter movement being called the "return" stroke of operation. The two movements constitute what is generally known as a "single operation" of the machine.

During the forward stroke, a series of actuator racks 15 are released. They move upward under the influence of springs until they are arrested in differential positions by the engagement of stop bars 16, connected to them, with the stems of depressed amount keys. Each actuator rack carries a type bar 17 that is differentially positioned along with its actuator rack and after the type bars are positioned, a printing mechanism, of which the hammers 18 are shown in Fig. 1, is operated to print the item on a piece of paper carried by the platen P.

One or more registers are provided for cooperation with the actuator racks and the engagement and disengagement of the registers is controlled by a pitman 20. Only one register is shown in the drawings. The pitman normally occupies the position shown in Figs. 1 and 3 in which position the register is not in engagement with the actuator racks. The pitman is moved rearwardly by means of a drive plate 21 rocked by the drive shaft 14, the drive plate having two studs 22 and 23 for this purpose.

During the forward stroke in adding operations, the drive plate 21 rocks counterclockwise but the studs 22 and 23 do not engage any part of the pitman 20 to move it. However, the stud 23 passes a pawl 24 pivoted on the upper branch of the pitman and, near the beginning of the return stroke, said stud 23 engages a shoulder on pawl 24 and moves the pitman 20 rearwardly which rocks the register into engagement with the actuator racks. Near the end of the return stroke the stud 22 engages the hooked end 25 of the lower branch of pitman 20 and returns the pitman forwardly to rock the register out of engagement with the actuator racks.

When the total key T or sub-total key ST is depressed, a link 26 is moved downwardly which swings a pawl 27, pivoted on the lower branch of the pitman 20 into the path of the stud 22. Depression of the total key T also depresses the forward hooked end of a pawl 28 pivoted on the upper branch of the pitman 20 and the depression of pawl 28 also swings the pawl 24 out of the path of the stud 23. Accordingly, when the drive plate 21 rocks counterclockwise during the forward stroke of the machine, the stud 22 engages the end of pawl 27 and the pitman 20 is moved rearwardly to move the register into engagement with the actuator racks prior to their ascent. During their ascent, the racks rotate the register pinions back to "0" to take the total from the register, suitable stops, hereinafter described being provided for arresting the pinions of the register in "0" positions. Near the end of the forward stroke of the machine, if the total key T has been depressed, the stud 23 engages the hooked end of the pawl 28 and pulls the pitman forward again to rock the register out of engagement with the actuator racks prior to their descent and thus leave the register pinions in zero position.

Depression of the sub-total key ST causes the same results as explained above except that said key does not move the hooked end of the pawl 28 into the path of the stud 23 so that the pitman is not moved forward again at the end of the forward stroke with the result that the register pinions remain in engagement with the actuator racks during their descent and the total is put back in the register. Near the end of the return stroke the stud 22 engages the hooked end 25 of the lower branch of pitman 20 and rocks the register out of engagement with the actuator racks.

*Add-subtract registering mechanism*

The registering mechanism that has been found preferable, and which is illustrated in the present embodiment of the invention, is of the "tumbling register" type. It comprises two sets of interconnected register pinions. For convenience the lower set 30 (Figs. 3 and 5) will be called the "addition" pinions and the upper set 40 will be called the "subtraction" pinions although, in fact, the two sets of pinions operate together to perform addition and subtraction.

The "addition" pinions 30 are rotatably mounted upon a shaft 31 and the "subtraction" pinions 40 are rotatably mounted upon a shaft 41. The two shafts 31 and 41 are carried by a U-shaped tumbling frame 32 (Fig. 5) which is fixed to right and left hand stub shafts 33 journaled in a rockable register frame comprising two arms 34 fastened to a shaft 35 pivoted in the machine side frames (Fig. 5), there being suitable cross pieces between the arms. It is to be noted that the register pinion shafts 31 and 41 are on opposite sides of the axis of stub shafts 33 about which the U-frame 32 rocks. The register frame 34 is rocked forward and backward to engage and disengage the pinions with the actuator racks 15 by means of the pitman 20 heretofore described. This rocking is accomplished as follows:

Referring to Fig. 1, it will be observed that the pitman 20 is connected to a crank 36 fixed to a shaft 37. Also fixed to this shaft is a cam 38 having a cam slot engaging over a roller 39 on one of the stub shafts 33 that is journaled in the side arms of the register frame 34. When the pitman 20 is moved rearwardly from the position of Fig. 1, the cam 38 cams the roller 39 forward and rocks the register frame counterclockwise to cause the register pinions that are in operative position to engage the actuator racks. When the pitman 20 is pulled forwardly again, the cam 38, together with a spring 39ᵃ (Fig. 4), returns the register frame clockwise to disengage the register from the actuator racks.

Figure 3:
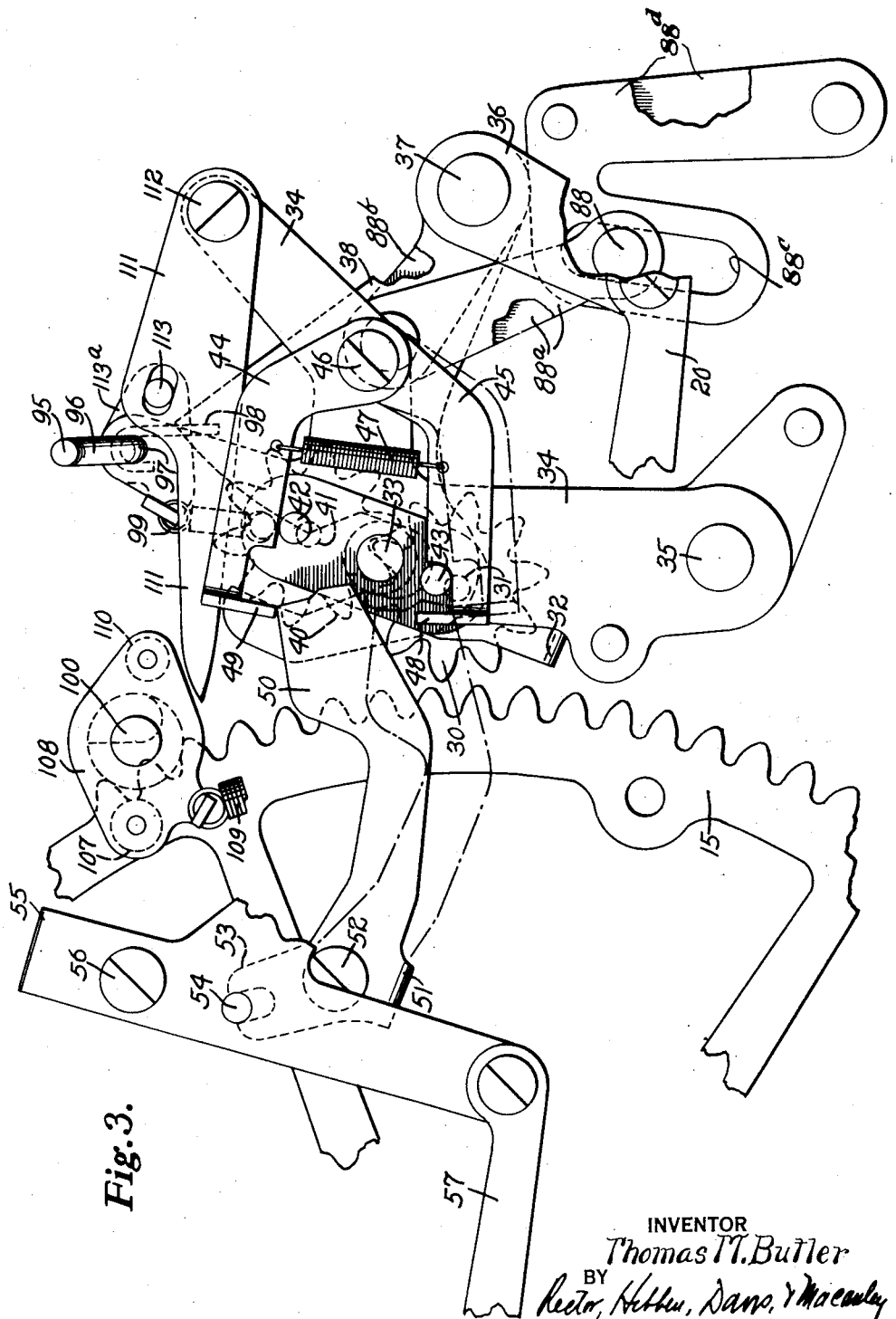
Fig. 3 is a partial right side elevation of the mechanism at the rear of the machine for controlling the addition and subtraction condition of the register, the parts being shown in addition condition.

For addition, the tumbling register mechanism occupies the position shown in Fig. 3. With the registering mechanism so positioned, it is engaged with the racks prior to their descent, and the "addition" pinions 30, in banks where keys have been depressed, are rotated counterclockwise as the racks descend to thereby register the item additively.

Figure 4:
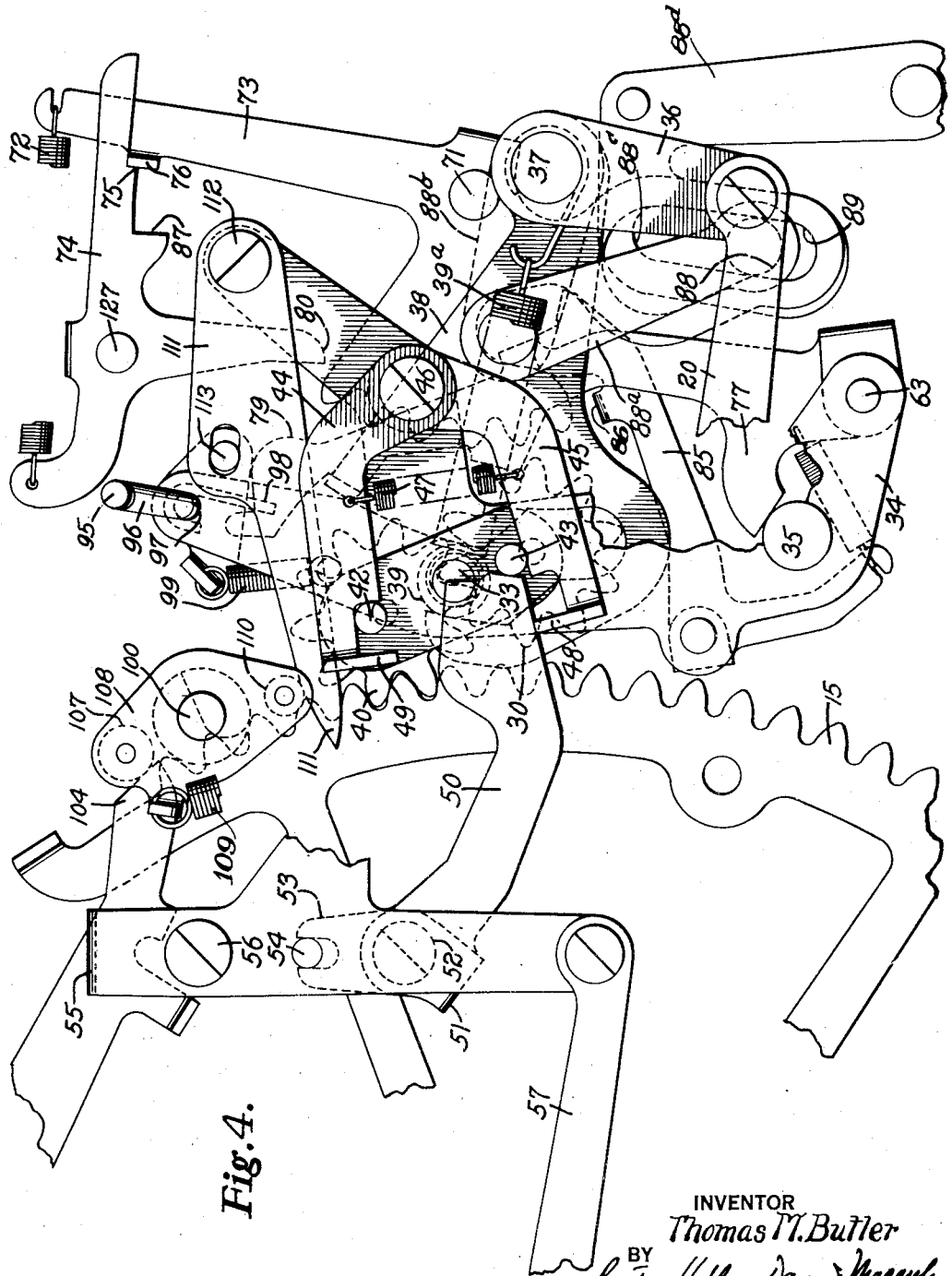
Fig. 4 is a partial right side elevation of the mechanism at the rear for controlling the addition and subtraction condition of the register, the parts being shown in subtraction condition with the registering mechanism in engagement with the actuator racks.

For subtraction, the tumbling register mechanism occupies the position shown in Fig. 4. With the mechanism in this position, it is engaged with the racks prior to their descent, and the descent of the racks will rotate the subtraction pinions 40, in banks where keys have been depressed, counterclockwise but this will rotate the addition pinions clockwise, i. e., in the direction opposite to addition. Subtraction and addition are thus performed by rotating the pinions 30 in opposite directions.

*Automatic conditioning of register mechanism*

As previously mentioned, provision is made for automatically conditioning the registering mechanism for addition or subtraction without the necessity for giving the machine a spacing stroke.

Figure 5:
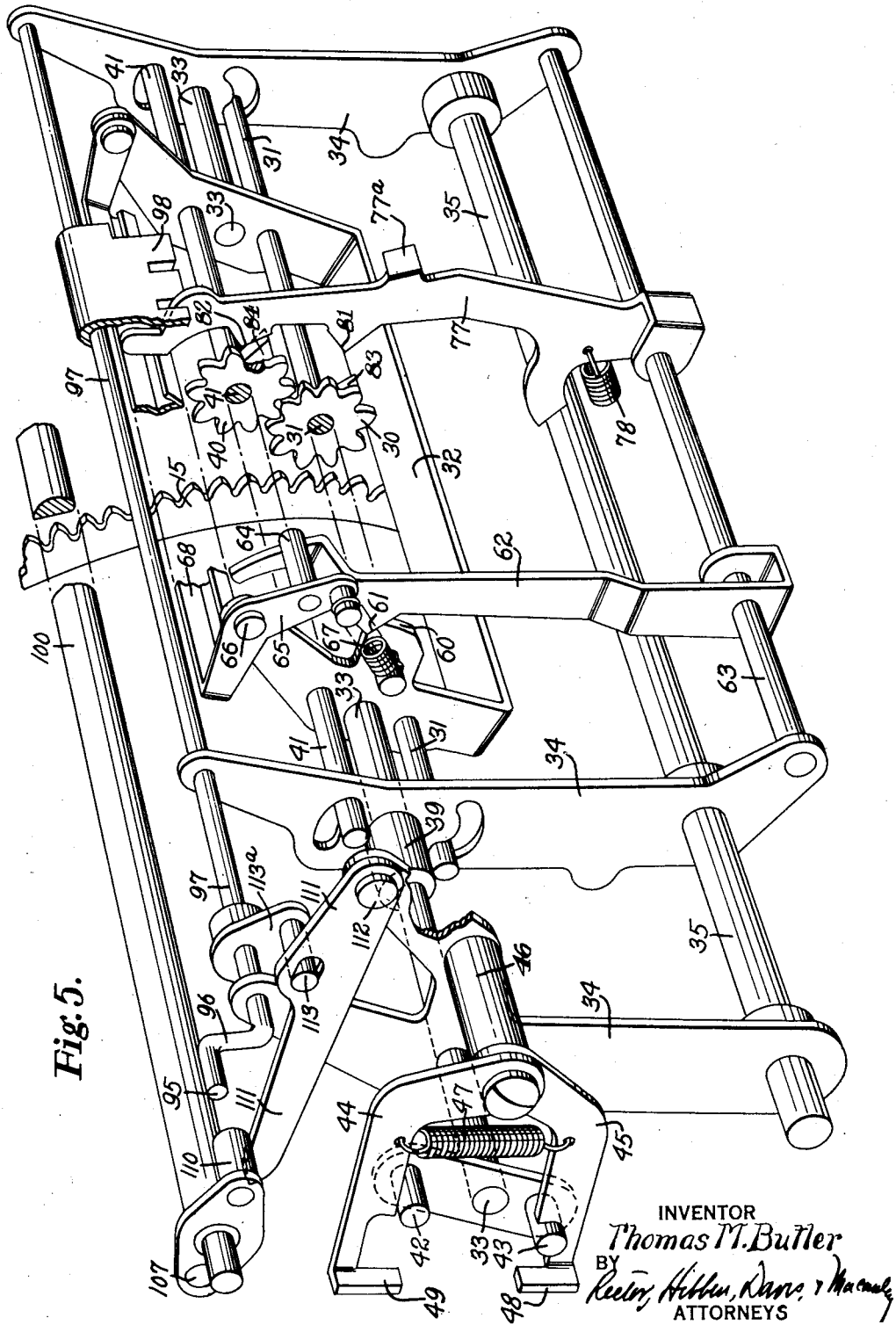
Fig. 5 is a perspective view of a portion of the mechanism at the rear of the machine showing the supporting mechanism for the register and certain of the controls.

Referring to Figs. 3 and 5, it will be observed that the left hand stub shaft 33 is provided with a plate on its left end carrying two studs 42 and 43 which are positioned on opposite sides of the axis of the shafts 33. Cooperating with these studs is a scissors-like latch mechanism comprising members 44 and 45 pivoted on a stud 46 on the left hand arm of the register frame 34 and urged toward each other by a spring 47. The members 44 and 45 have shoulders for cooperating with their respective studs 42 and 43 and they have lateral lugs 49 and 48 respectively at their left hand ends as viewed in Fig. 4.

When the tumbling frame 32 is in the position shown in Fig. 4, the shoulder on the upper arm 44 engages over the stud 42 and locks the tumbling frame in the position shown. When the tumbling frame 32 is in its opposite position, such as shown in Fig. 3, the shoulder on the lower member 45 engages the stud 43 and the tumbling frame is locked in this position.

Positioned between the lugs 48 and 49 is an arm 50 (Fig. 3) the edges of which are adapted to engage the lugs when the arm is moved up and down. The end of the arm 50 is shaped to engage studs 42 and 43 as will be presently described. This arm 50 projects from a yoke 51 pivoted at 52 on the machine frame. The yoke 51 has another arm 53 having a bifurcated end engaging over a stud 54 on a yoke 55 pivoted at 56 on the machine frame. The latter yoke 55 has an arm that is connected to a link 57 which, in turn, is connected to the subtract lever 12 (Fig. 1). The above described mechanism operates to automatically tumble the registers as follows:

Assume that the registers are in the position shown in Fig. 3 which is the addition position. The subtract lever 12 will be in the full line position of Fig. 1. Assume, also, that it is desired to subtract an item in the register. The subtract lever 12 is moved rearwardly to the dot-dash position of Fig. 1 which pushes the link 57 rearward. This rocks the yoke 55 counterclockwise and the latter, in turn, rocks the yoke 51 and its arm 50 clockwise. The arm 50 moves downward into engagement with the lug 48 on arm 45 and moves it down to disengage its shoulder from the stud 43 at the same time, the front end of the arm 50 moves in front of the stud 43. At the beginning of the return stroke of operation of the machine, the register frame 34 is rocked counterclockwise by cam 38, said register frame carrying the tumbling frame 32 and the registers 30 and 40 with it. As the register frame 34 rocks counterclockwise the stud 43 on the tumbling frame is blocked by the end of the arm 50 with the result that as the register frame continues its movement, the tumbling frame is automatically rocked counterclockwise until it reaches the position shown in Fig. 4 where the latch 44 snaps down behind the stud 42 and holds the tumbling frame in its new, or subtraction position. This movement occurs very quickly, that is, the register frame 34 is rocked immediately at the beginning of the return stroke of the machine and the tumbling frame is likewise tumbled immediately by the movement of the register frame, the whole movement being such that the tumbling frame is tumbled to proper position prior to the engagement of the register pinions with the actuator racks.

If, when the tumbling frame 32 is in the position of Fig. 3, an item is added, the above described action does not take place because the arm 50 remains in its upper position and there is no occasion for tumbling the registers because the "addition" pinions are already in position.

If, however, the tumbling frame 32 should be in "subtraction" position at the time an item is to be added the frame is automatically tumbled. In order to add the item, the subtraction lever is moved from its dot-dash to its full line position in Fig. 1. This rocks yoke 55 clockwise and causes arm 50 to move counterclockwise. The edge of arm 50 engages the lug 49 and raises the latch arm 44 away from the stud 42. At the same time the end of arm 50 moves in front of the stud 42 so that, at the beginning of the return stroke of the machine, in performing addition, the rocking of the register frame 34 automatically tumbles the frame 32 from its "subtract" position to its "add" position where it is locked by the latch 45, the action being just the reverse of the tumbling movement first described.

Provision is made for locking the register pinions against accidental turning while they are being tumbled by a mechanism as follows:

The tumbling frame 32 is provided with a rearwardly extending projection 60 (Fig. 5) having two cam faces cooperating with a nose 61 on an arm 62 pivoted on the shaft 63 carried by certain of the side arms of the register frame 34. The upper end of arm 62 is curved and its rear edge cooperates with a stud 64 on an arm 65 pivoted at 66 and urged clockwise by a spring 67. This arm has a forward extension that supports one end of a bail 68 whose other end is supported by a similar arm. The bail 68 is adapted to move between the teeth of the pinions 40 and, when so positioned, the pinions are held against rotation. Since the pinions 40 are in mesh with pinions 30, the pinions 30 are also held against rotation. When the registers are in the position shown in Fig. 5, the bail is in the position there shown and the register pinions are free to rotate. When the registers are tumbled by the rocking of the frame 32, the movement of this frame causes one of the cam faces to act on cam nose 61 to swing the arm 62 clockwise. The cam edge on the upper curved edge of the arm 62 engages the stud 64 and moves arm 65 counterclockwise against the tension of spring 67 and swings the bail 68 downward between the teeth of the pinions 40. In other words, as the registers are tumbled, the bail 68 is swung downwardly to prevent the pinions from turning. After the registers have been tumbled to their new position the cam projection 60 passes the nose 61 whereupon the spring 67 rocks the arm 65 and bail 68 back to original position to free the register pinions. In this manner the pinions are momentarily held against rotation while the registers are being tumbled.

From the above description of the control of the registering mechanism it will be clear that this mechanism is automatically placed in proper condition in accordance with the conditioning of the machine and this occurs without the necessity for a spacing stroke. The registers are tumbled automatically as they are rocked into engagement with the racks.

While the embodiment of the invention shown is associated with a registering mechanism of the tumbling register type, it is to be understood that the invention, in its broad aspects, is not limited to tumbling registers, but may include registering mechanism of other types such as those in which the add-subtract register pinions are moved longitudinally instead of being tumbled or where two sets of actuator racks or racks with two sets of teeth are employed.

*Transfer mechanism*

The transfer mechanism is of the type shown in Patent No. 1,853,053 suitably modified to cooperate with two sets of register pinions instead of one. This mechanism is best illustrated in Figs. 6 to 9 inclusive. Inasmuch as the construction is the same for each bank except the units bank and the bank of highest order, both of which will be described later, the description of the transfer mechanism will be confined to one bank.

Each order of the transfer mechanism includes a toothed transfer segment 70 with a sufficient number of teeth to permit it to be engaged by either its "addition" or its "subtraction" pinion, depending upon which is in position for such engagement when the register is rocked rearwardly out of engagement with the actuator racks. This transfer segment is pivoted on a shaft 71 and urged counterclockwise as viewed in Fig. 6 by a spring 72 connected to the arm 73 of the segment. It is normally detained against such movement, however, by a latch 74 having a shoulder 75 engaging a lug 76 on the arm 73 of the transfer segment.

Figure 6:
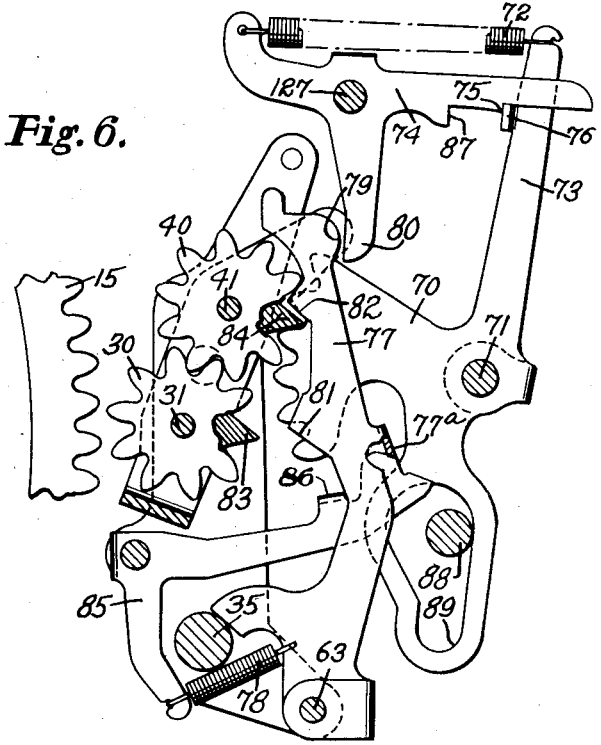
Fig. 6 is a view of the transfer mechanism in normal addition position.
Figure 7:
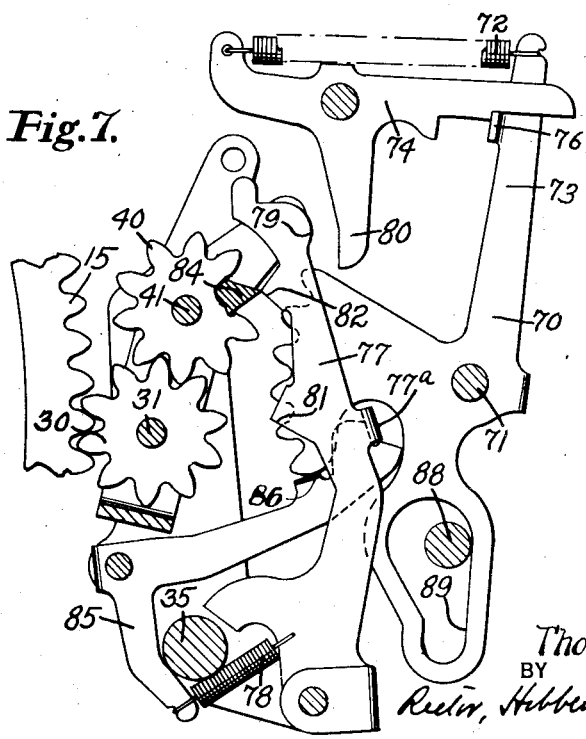
Fig. 7 is a view similar to Fig. 6 with the parts in "initial carry" position.

The latch 74 is released by means of a trip pawl 77 pivoted on shaft 63 and urged counterclockwise by a spring 78, said pawl having a shoulder or nose 79 on its upper end positioned to engage a downwardly extending projection 80 on the latch 74. The trip pawl 77 has two cam noses 81 and 82 adapted to cooperate with respective transfer projections 83 and 84 on the respective pinions 30 and 40, the cam nose 81 cooperating with a transfer projection comprising a wide tooth 83 on the pinion 30 and the cam nose 82 cooperating with a transfer projection comprising a wide tooth 84 on the pinion 40. Briefly, the operation is as follows:

Assume that the register pinions are in the position shown in Fig. 6 and that addition is to be performed. As the machine is operated the pinions 30 will move into engagement with the actuator racks just prior to their descent. This moves the pinions 40 away from the transfer mechanism as illustrated in Fig. 7. Assume that one of the pinions 30 passes through its "0" position as the racks descend. When this occurs, the transfer projection 84 on the pinion 40 which is geared to 30, acts on nose 82 and pushes the trip pawl 77 rearwardly to the position of Fig. 7. The trip pawl 77 is latched in this position by a latch 85 that is urged upwardly by the spring 78 behind a lateral lug 77ᵃ on the trip pawl 77. The above movement is what is called an "initial transfer", that is, the parts are set to the position of Fig. 7 so that a transfer will take place when the registers are rocked out of engagement with the actuator racks and into engagement with the transfer segments.

Figure 8:
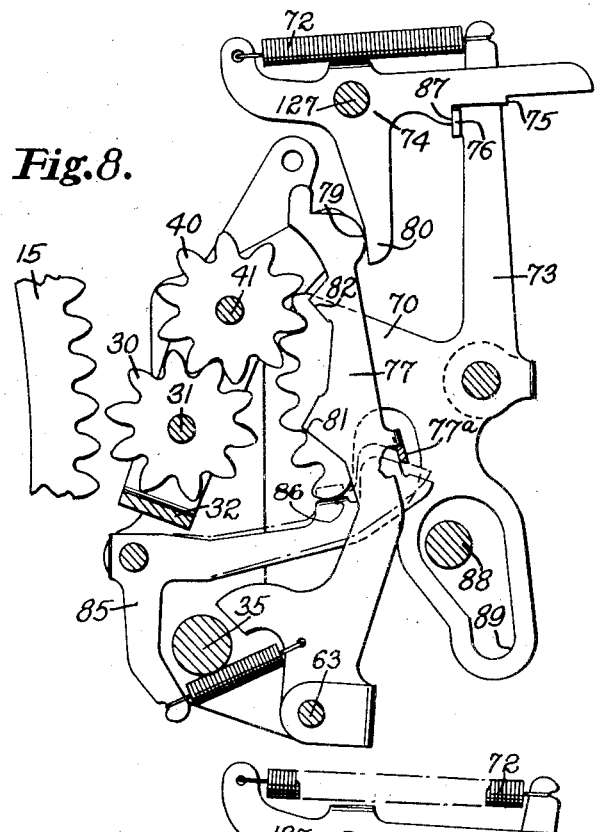
Fig. 8 is a view similar to Fig. 6 with the parts in the positions they occupy after a full carry has taken place.

Near the end of the return stroke of the machine the register frame 34 is rocked to rock the pinions 30 out of engagement with the actuator racks which causes the pinions 40 to engage the transfer segments 70. As the registers are rocked rearwardly, the pawl 77 that has been moved rearwardly and which is held in position by its latch 85, engages the arm 80 of its latch 74 and swings the latch upwardly to release the transfer segment which thereupon moves counterclockwise under the influence of its spring 72, the movement being limited to one step by a shoulder 87 on the latch 74. This causes a full transfer, the position of the parts after such transfer is effected being shown in Fig. 8. It will be understood, of course, that the tripping pawl 77 for one order releases the transfer segment of the next higher order. As the transfer segment 77 moves as above described, it advances the pinion of next higher order one step and thus effects a transfer, the movement being effected in both the pinions 30 and 40. In its movement, the transfer segment engages a laterally projecting lug 86 on the latch 85 and rocks the latch clockwise as seen in Fig. 8 to release the trip pawl 77 which is then restored to normal position by its spring 78.

The transfer segments are restored to normal by means of a restoring bail 88. Referring to Figs. 4, 6-9, it will be observed that a restoring bail 88 cooperates with the cam slots 89 by the lower portions of the transfer segments. The bail is carried by arms 88ᵃ (Fig. 4) one of which is pivoted on the cam plate 38 which controls the rocking of register frame 34 and another of which is pivoted to an arm 88ᵇ fixed to shaft 37 (Fig. 4). The bail 88 also engages in slots 88ᶜ in members 88ᵈ and is thereby guided in its movement. As the cam 38 swings counterclockwise to move the registering mechanism into engagement with the actuator racks the bail 88 is moved downward and it engages one of the edges of the cam slots 89 in the tripped transfer segments to return them to normal. In adding operations this occurs at the beginning of the return stroke of the machine. In totaling operations it occurs at the beginning of the forward stroke because the controls of the machine are then conditioned so that the registers are rocked into engagement with the actuator racks at the beginning of the forward stroke. This timing of the restoration of the transfer segments in connection with the taking of a total should be noted in order that it may be clear that no additional spacing stroke is necessary to restore these segments prior to the taking of a total. At the end of the last calculating operation the segments are left in the positions to which they were moved by the last calculation. When a total is taken the segments are automatically restored as the register is moved into engagement with the actuator racks with the result that the transfer segments are all moved to normal before the totaling operation starts.

Figure 9:
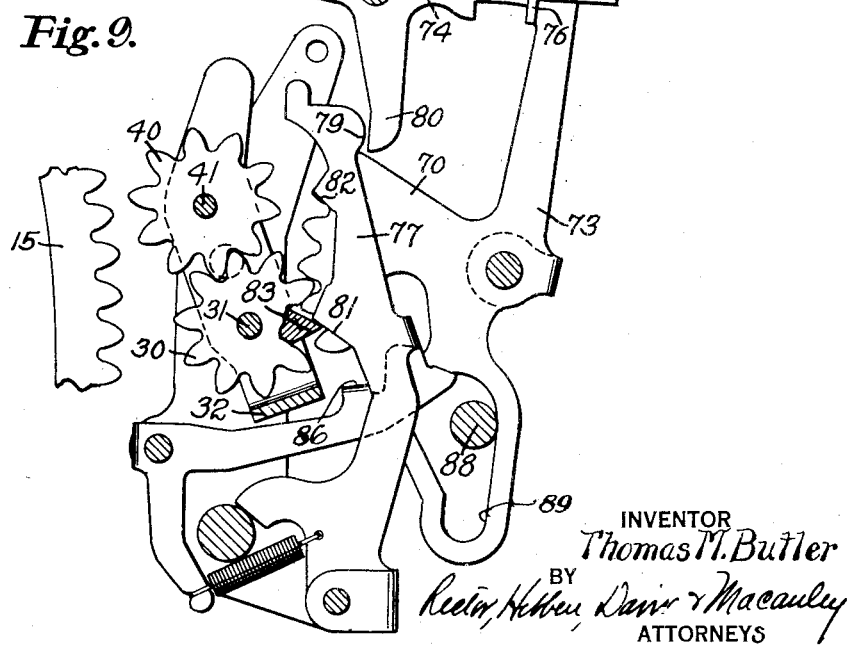
Fig. 9 is a view similar to Fig. 6 with the parts in position to effect a borrow instead of a carry.

When a borrow is to be effected instead of a carry, the operation of the transfer mechanism is the same but, in borrowing, the transfer projections 83 on the add pinions 30, are the projections that trip the pawls, the position of the parts being illustrated in Fig. 9.

The above transfer mechanism operates in the same manner as that of Patent No. 1,853,053 except that the trip pawls 77 are provided with two cam noses instead of one in order to adapt the mechanism to the two sets of register pinions. It has been found more convenient to operate these pawls through the set of pinions that is out of active position as this gives more room for the parts and does not necessitate changing the direction of movement of the transfer pawls for carries and borrows.

*Positive total taking*

The taking of positive totals does not differ materially from the standard procedure in the Burroughs portable but will be briefly described.

Depression of the total key T moves link 26 (Fig. 1) downward which moves pawl 27 on pitman 20 into the path of stud 22 so that the pitman 20 moves rearwardly at the beginning of the forward stroke and thereby rocks the registers into engagement with the actuator racks at the beginning of the forward stroke.

If the subtract lever is in "add" position at this time, and if the addition pinions are also in position for operation, the registering mechanism moves into engagement in the regular manner. If, however, the subtract lever is in "add" position and the subtract pinions 40 are in position for operation, the register is automatically tumbled as previously described so that the "addition" set of pinions 30 comes into engagement with the actuator racks, it being necessary to have this set of pinions engage the racks in the taking of a positive total.

As the machine starts to operate, the actuator racks rise and the "addition" pinions are rotated in a direction reverse to which they have been rotated in the entry of positive items in the machine. As is well understood in the art, these pinions must be arrested at their "0" positions in order that the actuator racks may be arrested in differential positions corresponding to the amount in the register. The pinions are arrested in "0" position as follows:

Referring to Fig. 1, when the total key T is depressed, a lever 90 pivoted at 56 is rocked counterclockwise. This lever carries a stud 92 that engages a portion of a lever 93 also pivoted at 56 and provided with a spring held pawl 94 on its rear end. It is to be noted that when the subtotal key ST is depressed it rocks lever 93 independently of 90 and moves the pawl 94. In other words, the pawl 94 is controlled by both the total and the subtotal keys. When either the total or the subtotal key is depressed, this pawl is moved upwardly so that its end is in front of a wrist pin 95 on the end of the crank 96 attached to a shaft 97 (Figs. 4 and 5) carrying a comb plate 98. This shaft and comb plate are carried by the upper ends of the side arms of the register frame 34 so that, as the register is rocked into engagement with the actuator racks, the comb plate is moved forwardly. If, at that time, the pawl 94 is positioned to engage the wrist pin 95, the comb plate 98 is rocked clockwise and, when rocked clockwise, it moves in behind upper extensions of the trip pawls 77 so as to prevent them from moving rearwardly. The result is that, when the wide faced teeth 83 or 84 of the register pinions reach the noses 81 or 82 as the case may be, the pinions are arrested because the wide faced teeth cannot cam the trip pawls 77 rearward. When the register frame is rocked rearwardly again to disengage the pinions from the actuator racks the comb plate moves back to normal under the influence of a spring 99 (Fig. 4) that urges it to normal position. It will be observed by reference to Fig. 5, that the comb plate also acts as a guide for the pawls 77.

The comb plate 98 is used to perform another function and that is to insure that the trip pawls 77 always move forwardly with the register when the latter is moved into engagement with the actuator racks. The register is moved quite suddenly and, if the trip pawls should not follow because of inertia, an "initial carry" might be caused that would produce an error. In order to prevent this the plate 98 is rocked every time the register is moved into engagement with the actuator racks so as to positively move the trip pawls 77 forward. This rocking is accomplished as follows:

An aligning shaft 100 (Fig. 3, 4, and 5) for the actuator racks is supported in the machine side frames, said shaft being cut away to provide a portion of substantially semi-circular cross sections so that, when the shaft is rotated, the lower edge of the cutout portion moves between the teeth of the actuator racks to hold them in alignment. This shaft is rocked after the actuator racks have been differentially positioned at the end of the forward stroke of the machine. Referring to Fig. 1, the drive plate 21, which is rocked at each operation of the machine, is connected by a link 101 to an arm 102 pivoted at 103. Another arm 104 is pivoted at 105 to arm 102 and urged counterclockwise by a spring 106. The parts are proportioned so that, near the end of the forward stroke of the machine, the end of arm 104 engages a roller 107 (Fig. 4) on a rocker plate 108 fixed to the aligning shaft 100. This rocks the aligning shaft 100 clockwise against the tension of spring 109. The rocker plate 108 carries a second roller 110 (Fig. 5) positioned to be engaged by the end of an arm 111 pivoted at 112 to an extension of one of the arms of the register frame 34. The arm 111 has a slot engaging over a stud 113 on crank arm 113ª fixed to the shaft 97 (Fig. 5). When the aligning shaft 100 and its rocker plate 108 are rocked as above described on the forward stroke of the machine, the roller 110 engages the free end of the arm 111 and rocks it counterclockwise thereby causing the stud 113 to rock the shaft 97 and its comb plate 98 clockwise so that the inner edges of the guide slots in the comb plate will be positioned against the rear edges of the vertical extensions of the pawls 77 to positively insure that said pawls will move forward simultaneously with the register frame 34 at the beginning of the return stroke and thus prevent an accidental "initial transfer" with its consequent full transfer. The lagging of the pawls 77 might otherwise result in latches 85 engaging behind the lugs 77ª on pawls 77 as in Fig. 7 with the result that an incorrect transfer would take place. During the return stroke of the machine, before the descent of the actuator racks 15, the clockwise rotation of the driving plate 21 causes the aligning shaft 100 to be rocked out of engagement with the teeth of the actuator racks, and moves the roller 110 away from the arm 111 so that the comb plate 98 is permitted to be swung counterclockwise by the spring 99 to free the transfer pawls for "initial transfers" during the descent of the actuator racks.

Negative total taking

True negative totals are taken in much the same way as positive totals, that is, by depression of the same total key T and by giving the machine a single stroke of operation, but these totals are taken with the "subtraction" pinions 40 in engagement with the actuator racks as distinguished from the "addition" pinions 30 which must be in engagement with the racks in the taking of a positive total.

Assume that a negative total is created by subtracting a larger number from a smaller. The machine is placed in subtraction condition to perform the subtraction operation and it normally remains in this condition at the end of said operation. Assume that the negative total is to be taken with the parts in this condition. This means that the registering mechanism has been tumbled so that the "subtraction" pinions are in position to engage the actuator racks when the registering mechanism is moved to accomplish that purpose.

When the negative total occurred the subtraction pinions 40, during the subtraction operation, were moved counterclockwise by the descent of the actuator racks and this moved said pinions forward from their "0" positions to positions indicating the negative total. At the same time the addition pinions 30 were rotated clockwise, or backwards as far as addition operations are concerned, and these pinions move backwards through their "0" positions to positions that show the complement of a true negative total. As an example, assume that 555 is subtracted from 333. Before operations are started the pinions stand as follows:

Addition pinions_____ 000,000,000
Subtraction pinions_____ 999,999,999

The first operation is to add 333 into the addition pinions and after this operation takes place, the pinions stand as follows:

Addition pinions_____ 000,000,333
Subtraction pinions_____ 999,999,666

In other words, when the addition pinions are rotated forward from their "0" positions to register the item 333 the subtraction pinions move backward from their "0" positions to show the complement.

Now, when 555 is subtracted, the subtraction pinions are moved forward again past their "0" positions while the addition pinions are moved backward so that the pinions stand as follows, the "fugitive 1" being disregarded for the moment and it being assumed that it is inserted so that no error of a unit occurs:

Addition pinions_____ 999,999,777
Subtraction pinions_____ 000,000,222

If, with the pinions in this position, and with the subtraction pinions positioned to engage the actuator racks when the registering mechanism is moved, the total key is depressed and the machine actuated, the negative total is taken as follows:

Depression of the total key T moves the lever 90 so as to position the end of the pawl 94 in the path of wrist pin 95 on the crank 96 so that, as the machine is operated, and the register moves into engagement with the actuator racks, the bail 98 is rocked to block all the trip pawls 77 against movement to cause them to act as stops to arrest the register pinions in "0" positions. The registering mechanism moves into engagement with the actuator racks and, as the racks ascend, they rotate the subtraction pinions clockwise. Each of the subtraction pinions in the first three orders will move two steps. None of the pinions in the higher orders will move because these pinions are already in their "0" positions. The result is that the actuator racks in the first three orders are allowed to move upward two steps each with the result that the type bars will be correspondingly positioned and the correct negative total will be printed.

If it should happen that, after a negative total occurs, another item is added in the machine which item is, however, too small to change the negative total to a positive total, the machine might be in addition condition at the end of operations, but a negative total would be in the registering mechanism. As will be clear from the above, it is necessary, in order to take a negative total, for the registering mechanism to be in position so that the subtraction pinions will engage the actuator racks. This means that the registers must be tumbled before the negative total is taken. The tumbling of the registers occurs automatically if the subtraction lever is moved to subtraction position before the total is taken and, in one species of the invention, a lock is provided that prevents depression of the total key if the subtract lever happens to be in "add" position at the time an attempt is made to take a total when there is a negative total in the machine. This notifies the operator that a negative total exists and he then moves the subtract lever to subtract position which releases the total key and enables the negative total to be taken directly as above explained. In another species, the tumbling of the registers occurs automatically without requiring a manual shift of the subtraction lever. These species will be described in detail later.

Fugitive one

When the pinions of a register that is capable of both addition and subtraction move either forward or backward through their 000,000,000 position, an error of 1 occurs in the units order which is known in the art as the "fugitive 1". This may be briefly explained as follows:

Each of the register pinions of a calculating machine usually has a transfer projection that cooperates with a transfer pawl. When the register pinions are in 000,000,000 position ready for the addition of items, the transfer projection of each pinion is immediately adjacent its pawl. As an item is added the projections move away from their pawls in an additive direction. When one of the pinions comes around to its "9" position, its transfer projection is again adjacent its transfer pawl but on the opposite side from which it started. The next step of movement given to this pinion trips the transfer pawl and causes a carry.

If subtraction is to be performed, the transfer projections of the pinions should start from their transfer pawls in a like manner, that is, they should start from zero positions adjacent the pawls and move away from the pawls. In subtraction, however, the pinions move in the reverse direction as compared with addition. When the pinions are in their 000,000,000 positions for addition, it will be evident that the transfer projections are on the wrong side of the pawls as far as subtraction is concerned. For example, taking any one pinion, assume that it is in "0" or "addition starting" position with its transfer projection just in front of its transfer pawl. In addition operations, the transfer projection moves from its "0" position away from the transfer pawl. If, with the pinion in this position, it were rotated subtractively, that is, in the reverse direction, the first step of movement would not move the transfer projection from its pawl, as it should, but would move it against the pawl with the result that the first step of movement would cause a transfer which is incorrect. For subtraction, the transfer projections should start from a position on the opposite side of the transfer pawls to what they do for addition.

The problem is, therefore, to get the pinions from a "starting position for addition" to a "starting position for subtraction". One of the easiest ways to do this is to cause a transfer to take place across the register.

For example, assume that the pinions are in their 000,000,000 position for addition. Now, assume, that the "units" pinion is moved backward, or subtractively, one step. This one step should be registered in the machine. This step of movement trips the "tens" transfer pawl and borrows 1 from the tens order pinion. The "tens" order pinion is then rotated backward one step so that its transfer projection moves to the opposite side of its transfer pawl. The "tens" pinion borrows 1 from the "hundreds" pinion and the "hundreds" pinion borrows 1 from the "thousands" pinion and so on across the register, with the result that all the pinions above the "units" order are moved by a series of transfers so that their transfer projections are on the opposite sides of their transfer pawls to what they were in their "starting position for addition". In other words, the projections are now in correct position for starting subtraction operations. The "units" pinion is also on the opposite side of its transfer pawl and in correct position for starting subtraction operations, but this pinion was moved to such position by the subtraction of one unit from it that should be registered. If a total were to be taken it would be 000,000,000 whereas "1" was actually subtracted from zero. Accordingly, instead of the "units" pinion actually being in correct position, it should be one step removed from its transfer pawl to show that the one unit has been subtracted. The movement of the units pinion one step to properly position it is called "kicking in the fugitive 1".

It thus becomes clear that an expedient for getting the pinions in their correct "starting position for subtraction" is to cause a transfer to take place, but, in order to cause this transfer, a unit has to be inserted in the units pinion. Subtraction of this unit causes the necessary transfer to get the pinions in correct position but the units pinion itself is not in correct position. It must be moved one step farther in a subtraction direction to record the unit that has been entered.

It is to be understood, of course, that when the register pinions are moved through their "0" positions in the reverse direction, that is, from a negative total condition to a positive total condition, the reverse of the above action takes place and provision must be made for kicking the "fugitive 1" into the units order in this case also.

Machines have been devised in which the "fugitive 1" is inserted by depression of a special key or by the movement of one of the control keys, such as the subtraction lever, which actuates mechanism to insert the "fugitive 1" directly. But this requires the manipulation of a special lever or key which introduces an extra operation. Also, in some machines, the insertion of the "fugitive 1" will result in tripping the transfer mechanism so that the machine must be given a spacing stroke every time the special key is depressed in order to be sure that the transfer mechanism is in normal position before a total is taken.

Other machines insert the "fugitive 1" every time the machine is changed from addition to subtraction condition and vice versa. This is usually accomplished by a subtraction lever or key which either actuates the mechanism directly or sets the mechanism that causes the "fugitive 1" to be automatically inserted when the machine is operated, as shown, for example, in Rinsche patent, No. 1,172,484. The difficulty with these constructions is that the "fugitive 1" is inserted many times when it is not needed because, while a multitude of subtraction operations may be performed, a negative total seldom occurs. Furthermore, insertion of this "fugitive 1" during every subtraction operation means that the machine must always be given a spacing stroke when changed from addition to subtraction in order to be sure that the transfer mechanism is in normal condition before the next operation. Sometimes two spacing strokes are required.

Other constructions make use of the register pinion of highest order and cause the "fugitive 1" to be inserted every time this pinion moves from its "9" to or through its "0" position and vice versa. One of the difficulties with these constructions is that if the register pinion of highest order should move through this position twice, two "fugitive 1s" would be inserted whereas only one is needed. Also, if the capacity of the machine is exceeded in a positive direction, the register pinion of highest order passes from its "9" through its "0" position and a "fugitive 1" is inserted when one is not needed. Also, this type of construction makes a spacing stroke of the machine necessary.

In the present invention, the "fugitive 1" is inserted by a mode of operation differing from any of the prior devices. It is entered automatically without requiring the manipulation of any special keys or levers and it is not entered every time a subtraction operation occurs or every time the register pinion of highest order moves through its "0" position. Instead, it is entered automatically only when the register goes from positive to negative condition and vice versa. The novel mechanism for accomplishing this result will now be described.

Figure 10:
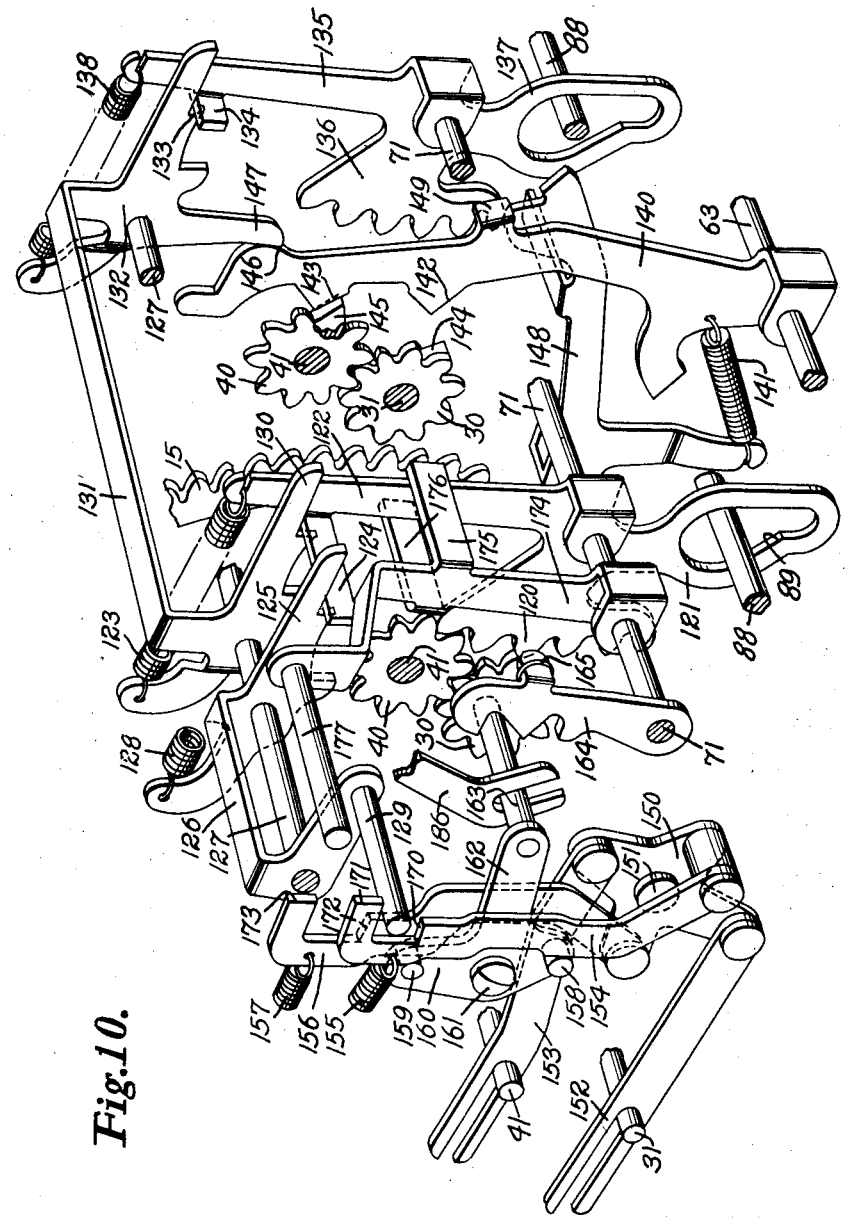
Fig. 10 is a perspective view of the "overdraft" and "fugitive 1" mechanisms, all parts being in normal or adding condition.

Referring to Fig. 10, the pinions 30 and 40 of the "units" order are provided with a segment 120 similar in construction to the transfer segments of the transfer mechanism. This segment is pivoted on the shaft 71 and it has a lower cam-slotted projection 121 with which the restoring ball 88 cooperates to restore the segment in the same way that the transfer segments are restored. The segment has an upwardly extending arm 122 to which is connected a spring 123 that urges the segment in a counterclockwise direction. The arm 122 has a relatively long lateral lug 124 with which cooperates a latch 125 constituting one arm of a yoke 126 pivoted on the shaft 127 and urged clockwise by a spring 128. The other arm of the yoke 126 carries a stud 129.

The "fugitive 1" segment 120 is also controlled by a second latch 130 cooperating with the lateral lug 124. This latch constitutes one arm of a yoke 131 pivoted on shaft 127 and urged clockwise by the spring 123 that urges the segment arm 122 counterclockwise. The other arm 132 of the yoke 131 has a shoulder 133 cooperating with the lateral lug 134 on the arm 135 of a segment 136. The segment 136 is constructed like the transfer segments of the transfer mechanism and is provided with a lower cam-slotted extension 137 for cooperation with the restoring ball 88 by means of which the segment is restored to normal at the same time the transfer segments are restored. The segment is urged counterclockwise by a spring 138 which also acts to urge the yoke 131 clockwise.

Pivoted on the shaft 63 is a trip pawl 140 urged counterclockwise by a spring 141 and provided with two cam noses 142 and 143 similar to those on the trip pawls of the transfer mechanism. These cam noses cooperate with wide faced teeth 144 and 145 on the register pinions of highest order. The trip arm 140 has a rear hump or nose 146 adapted to engage a downwardly extending projection 147 of the yoke 131. A latch 148 is provided for holding the trip arm in its tripped position, said latch being adapted to engage behind a lateral lug 149 on pawl 140, the latch being urged counterclockwise by spring 141.

If one of the register pinions of highest order moves from its "9" to or through its "0" position or vice versa, the trip pawl 140 is rocked clockwise where it is held by the latch 148 which moves behind the lateral lug 149. The pawl is thus held in its set position and, when the register is moved out of engagement with the actuator racks, the shoulder 146 on pawl 140, engaging the downwardly projecting arm 147 of yoke 131, rocks the yoke counterclockwise and lifts the latch 132 to release the latch 130. This also releases the latch 132 and allows segment 136 to move but the latter performs no function. It is used because it is easier to use parts similar to the transfer mechanism and it is useful in restoring the parts to normal.

Although the trip arm 140 is set by either of the register pinions of highest order regardless of the direction in which they move, neither the setting of this trip arm nor the rocking of the yoke 131 causes the insertion of a "fugitive 1" in the units order pinion. The mechanism does not act as a transfer mechanism for transferring a unit from the highest to the lowest order pinion and a "fugitive 1" is not inserted in the units order every time the register pinions of highest order go from their "9" to "0" position and vice versa.

Referring to the lower left-hand corner of Fig. 10, it will be observed that a four-armed lever 150 is provided pivoted on a frame stud 151. Pivoted to one arm of this lever and extending forwardly is a link 152 having a slotted end engaging over the end of the shaft 31 on which the addition pinions 30 are mounted. Pivoted to another and to the opposite arm of the four-armed lever is another link 153 having a slotted end engaging over the end of the shaft 41 on which the subtraction pinions 40 are mounted. It will be apparent that when the registers are tumbled the four-armed lever 150 is rocked accordingly by either the shaft 31 or 41.

Pivoted to a third arm of the four-armed lever 150 is a vertical link 154 urged counterclockwise by a spring 155 and pivoted to the fourth arm of the four-armed lever is another vertical link 156 urged counterclockwise by a spring 157. The two vertical links 154 and 156 are limited in their counterclockwise movement by the engagement of the rear edges of the links with studs 158 and 159 on a member 160 pivoted at 161. This member has a rear extension 162 carrying a stud 163 that cooperates with notches in a pivoted detent 164 urged counterclockwise by a spring 165 (Fig. 11).

The upper end of the vertical link 154 is provided with a shoulder 170 and a bent end 171 which serve to form a notch in which the stud 129 on yoke 126 may be positioned, the notch being longer than the diameter of the stud so that the stud can have a limited movement in the notch.

The upper end of the vertical link 156 has a shoulder 172 and a bent end 173 forming a notch also adapted to cooperate with the stud 129, said notch also being longer than the diameter of the stud.

Figure 11:
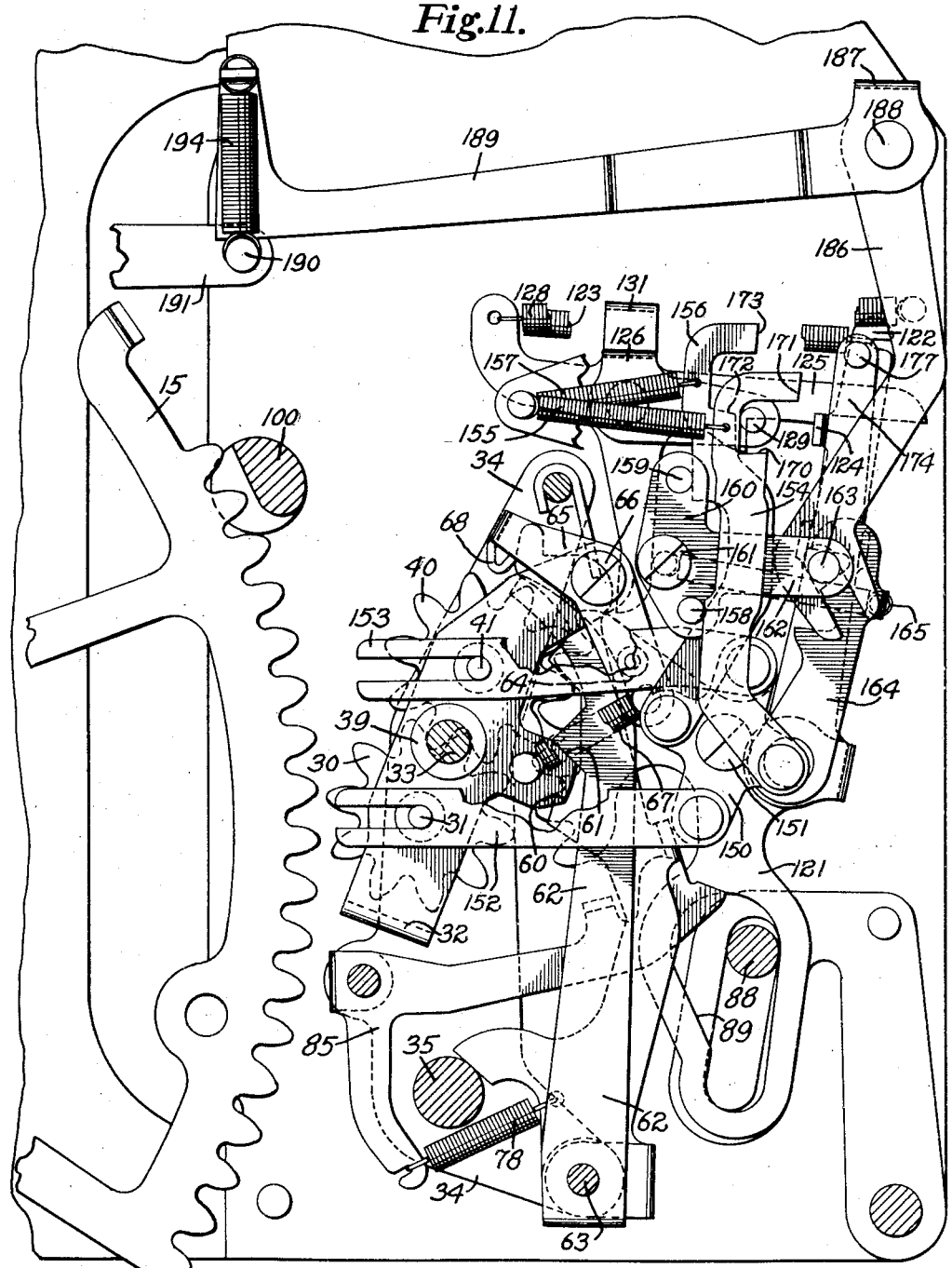
Fig. 11 is a partial right side elevation of a portion of the "overdraft" mechanism, the register being in addition condition.

When the machine is in addition condition with the registering mechanism at "0" or with a positive total in it the parts occupy the position illustrated in Fig. 11. It will be observed, by reference to Fig. 10, that the stud 129 is in the slot in the vertical link 154 and that the vertical link 156 is held back out of the path of the stud.

Figure 12:
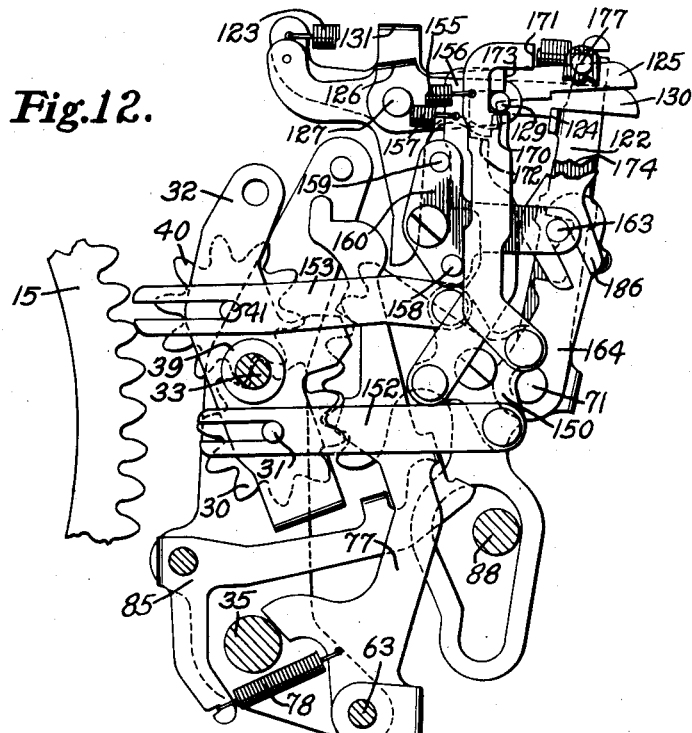
Fig. 12 is a view similar to Fig. 11 with the register in subtract condition and the parts in the positions they occupy before an overdraft occurs.

Assume that the registering mechanism is changed to subtraction condition, which, it will be recalled, occurs automatically as the machine starts to operate when the subtraction lever has been moved to subtraction position. As the registers are tumbled counterclockwise, the four-armed lever 150 is rocked counterclockwise. This thrusts the vertical link 154 upward and pulls the vertical link 156 downward. As the vertical link 154 moves upward its shoulder 170 engages the stud 129 and rocks the yoke 126 counterclockwise to lift the shoulder of latch 125 above the lateral lug 124 on the "fugitive 1" segment arm 122. The position to which the parts are moved is shown in Fig. 12. As the link 156 moves downward its shoulder 172 moves lower than the stud 129 and the bent end 173 of said link engages over the stud 129 as shown in Fig. 12. Briefly stated, the result is that, if the registering mechanism is tumbled to subtract condition, the latch 125 is raised.

The registering mechanism is tumbled to subtract position as it is moved to engage the pinions with the actuator racks. If, while the subtraction operation is being performed, the registering mechanism goes to a negative total condition the trip arm 140 will be set. Then, when the register is rocked out of engagement with the actuator racks, the yoke 131 will be rocked to raise the latch 130. The latch 125 having already been raised, the "fugitive 1" segment 120 is free to move under the influence of its spring 123, which it does. As the register moves out of engagement with the actuator racks, the addition pinion 30 of "units" order moves into engagement with the teeth of the "fugitive 1" segment 120 and, as the "fugitive 1" segment rocks counterclockwise, it moves the addition pinion clockwise which, in turn, moves the subtraction pinion of the "units" order counterclockwise, which is subtraction direction. In other words, a unit is subtracted from the "units" pinion.

It is to be noted, however, that, as long as the register remains in addition condition, the parts remain in the position of Figs. 3 and 11, because the shoulder of latch 125 remains behind the lug 124. Even though the trip arm 140 is set by the pinion of highest order and the yoke 131 is rocked to release latch 130, the segment 120 will not be released because it is held in position by the latch 125. This prevents insertion of the "fugitive 1" when the capacity of the register is exceeded.

Assume next, that the subtraction operations above mentioned did not cause a negative total and that the registers are again tumbled back to addition condition. When this occurs the four-armed lever 150 is rocked clockwise and the link 154 will be moved downward while the link 156 will be raised. As the link 154 moves downward it frees the stud 129 and the spring 128 restores the latch 125 to latched position so that the parts are again in the condition of Figs. 3 and 11.

Assume, however, that after the parts have moved to the position of Fig. 12, caused by tumbling of the register to subtract position, a negative total occurs. When the negative total occurs, the arm 122 of the "fugitive 1" segment 120 moves counterclockwise as above explained. Referring now to Fig. 10, it will be observed that there is pivoted adjacent the arm 122 on the shaft 71 an arm 174 having two lateral lugs 175 and 176, one positioned on each side of the arm 122 of the "fugitive 1" segment. It will be clear that the arm 174 moves back and forth with the arm 122. Arm 174 carries a stud 177 on its upper end which normally occupies a position relative to the ends 171 and 173 of links 154 and 156 such as illustrated in Fig. 12. When a negative total occurs the "fugitive 1" arm 122 moves counterclockwise and carries the arm 174 with it. The stud 177 on arm 174 engages the end 171 of link 154 and forces the link counterclockwise to the position of Fig. 13. The rear edge of the link 154 engages the stud 158 (Fig. 12) on the member 169 and, as the link 154 moves counterclockwise, the member 160 is rocked clockwise from the position of Fig. 12 to that of Fig. 13, the member 160 being held in its new position by spring detent 164 (Fig. 10). As the member 160 moves clockwise, the stud 159, engaging the rear edge of the link 156, moves it clockwise to the position of Fig. 13 where it will be observed that the stud 129 is in the upper end of the notch of link 156. The shoulder 170 of link 154 has been moved from under the stud 129, and said stud is free to move downwardly, the stud being urged downward by spring 128 which also urges the latch 125 downward. The stud and latch do not immediately move downward because the latch is on top of the lug 124 but, as soon as the "fugitive 1" segment 120—122 is restored, as it is at the beginning of the next machine operation, the latch 125 moves down behind the lug 124 and the stud 129 moves down. Restoration of the segment 120 with its arm 122 also rocks arm 174 clockwise and withdraws stud 177 from in front of the bent end 171 of link 154.

Figure 13:
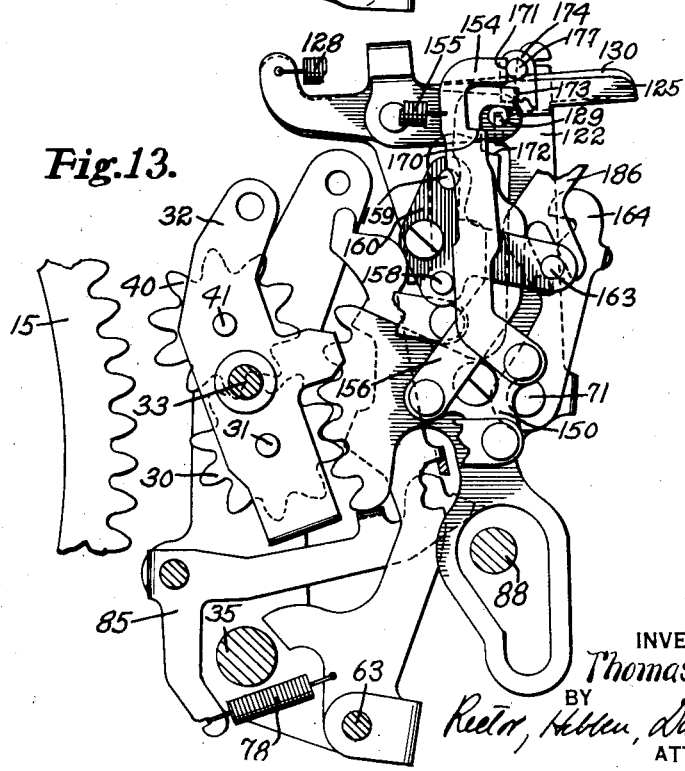
Fig. 13 is a view similar to Fig. 12 with the parts in the positions they occupy after an overdraft has occurred.

As long as the parts remain in the condition of Fig. 13, that is, with the registers in overdraft condition, the latch 125 cannot be tripped a second time because the stud 129 is out of the path of the shoulder 170 on link 154. Even though the register pinion of highest order is moved a second time from its "0" to or through its "9" position, which it would be if the capacity of the register were exceeded in a negative direction, a second "fugitive 1" will not be inserted. Such movement of the pinion would release latch 130, but latch 125 would not be released. Should the registers be tumbled to "add" position, the latch 125 would be released, but the capacity of the register could not be exceeded in a negative direction with the registers in this position.

If a negative total is taken to clear the registers, this negative total is taken with the registering mechanism in subtract position. The pinions are arrested in their "subtraction starting position" without going back to their "addition starting position" to cause a carry across the register. After the negative total is taken the registering mechanism remains in subtract condition and another number can be subtracted from "0" without inserting a second "fugitive 1".

Figure 14:
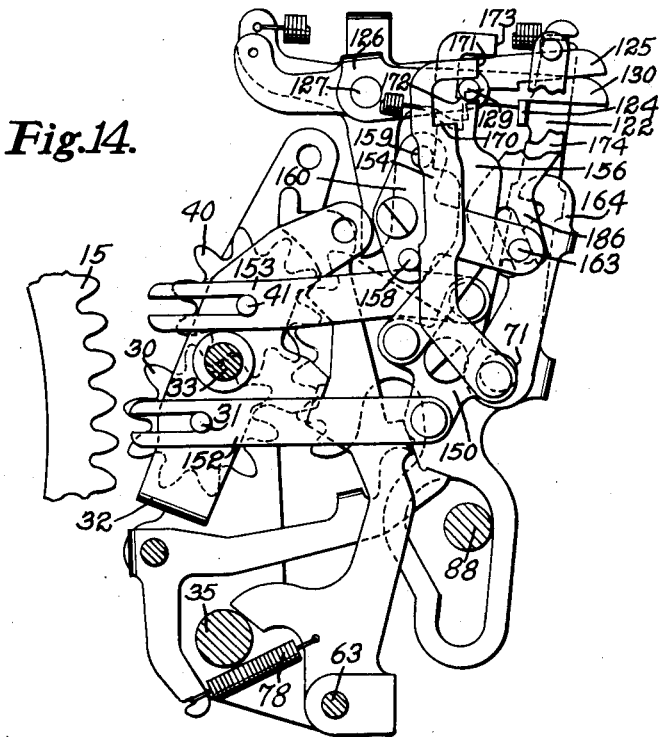
Fig. 14 is a view similar to Fig. 13 with the mechanism moved from subtract to add condition after an overdraft has occurred and after the machine has been operated.

Assume, next, that after a negative total has occurred and after the parts have moved to the position of Fig. 13, instead of clearing the registers, the registers are tumbled back to addition condition of Fig. 14 to add an item, which item does not, however, change the register from a negative to positive condition. When the registers are tumbled from "subtract" to "add" position, the four-armed lever 150 is rocked clockwise, the link 156 is pushed upward and the link 154 is pulled downward. As the link 156 moves upward its shoulder 172 engages the stud 129 (Fig. 14) and pushes the stud upward which rocks the yoke 126 counterclockwise and lifts the latch 125 away from the lug 124. The downward movement of the link 154 is an idle one.

As long as the registering mechanism remains in addition condition, the only condition under which the pinion of highest order could move through its "0" position would be when enough items had been added to change the total from a negative to a positive one. Should this occur, the trip pawl 140 is set and, as the register is rocked out of engagement with the actuator racks and into engagement with the transfer segments, the yoke 131 is rocked to lift the latch 130 whereupon the "fugitive 1" segment is rocked counterclockwise. At this time the "units" subtraction pinion 40 is in engagement with segment 120 so that the "fugitive 1" is put into the units order addition pinion in an addition direction. As the "fugitive 1" segment moves, the lug 176 is engaged by arm 122 and arm 174 is rocked counterclockwise. This causes stud 177 to engage the bent end 173 of link 156 which rocks the link 156 counterclockwise. The edge of link 156 engages stud 159 and rocks the member 160 counterclockwise to a position where it is held by the spring detent 164. The shoulder 172 of link 156 is thus moved from under stud 129 which is thereby released. The latch 125 is free to move downward to latched position which it does when the segment 120—122 is restored during the next machine operation. Restoration of segment 120 moves arm 174 clockwise and removes stud 177 from in front of the end 173 of link 156. The counterclockwise movement of member 160 causes stud 158 to rock the link 154 rearward so that the shoulder 170 of said link is beneath the stud 129. This movement of the parts occurs when the registers are tumbled to addition condition and a sufficient sum is added to the register to change it from negative to positive condition and it means that the latch 125 cannot be again raised until the register is moved to subtract condition because the link 156 with its shoulder 172 will be held out of engaging condition with stud 129 by spring 157 and such condition will not be changed until the registers are tumbled to subtract position and a negative total occurs. Accordingly, the capacity of the machine can be exceeded several times in a positive direction but, no matter how many times the register pinion of highest order is moved from its "9" to or through its "0" position, no "fugitive 1" will be inserted in the lowest order.

If the registers are tumbled to subtraction position again before the addition of items changes the total from negative to positive, the four-armed lever 150 is rocked counter-clockwise, and the link 156 moves downward to move shoulder 172 downward to release the stud 129 so that the latch 125 moves back to latched position under influence of the spring 128. At the same time the link 154 is moved upwardly but, since its shoulder 170 is back out of the path of the stud 129, it does not raise the stud. The parts are then again in the position of Fig. 13 so that no matter how many times the register pinion of highest order may release latch 130 by moving from its "0" to or through its "9" position by reason of exceeding the register capacity in a negative direction, a second "fugitive 1" will not be inserted because latch 125 is not released.

From the above it will be seen that the "fugitive 1" is automatically inserted only when the registers change from positive to negative condition and vice versa. It is not inserted every time the machine changes from addition to subtraction or vice versa; it is not inserted every time the pinion of highest order passes through "0", and it is not inserted when the capacity of the register is exceeded in either a positive or a negative direction. It is, however, automatically inserted at the proper time namely where the total changes from positive to negative and vice versa.

Negative total lock

It is sometimes advisable to have the operator notified as to the character of the total before he takes it. This is accomplished as follows:

Referring to Figs. 1 and 2, it will be observed that a sliding latch plate 180 is mounted between the plates of the keyboard, said slide having notches 181 and 182 in it (Fig. 2) that cooperate with vertical notches in the edges of the stems of the total and sub-total keys. This latch plate 180 is urged rearward by a spring 183 and it has shoulders 184 and 185 cooperating with the subtract lever 12.

When the subtract lever is in its addition (+) position, it engages the shoulder 184 and holds the slide 180 to the position of Fig. 2 where the notches 181 and 182 free the stems of the total and sub-total keys. When the subtract lever is moved rearward toward subtract (—) position, it releases the slide 180 which is thereupon moved rearwardly by its spring 183 so that the slide moves into the notches in the stems of the total and sub-total keys to lock them against depression. Accordingly, if the subtract lever is in "subtract" position with a positive total in the machine, the total and sub-total keys will be locked, and, when the operator attempts to take a total, he will find he cannot depress either the total or sub-total keys whereupon he looks at the position of the subtract lever. If it is in subtract position he knows that a positive total is in the machine and that he must move the subtract lever to addition position.

When a negative total occurs, a "fugitive 1" is inserted as heretofore described by the movement of the "fugitive 1" segment 120 with its arm 122. As the arm 122 moves, it moves the arm 174 with its stud 177. Stud 177 engages the end of link 154 (Fig. 13) and rocks the link counterclockwise. Link 154 engages stud 158 and rocks member 160 clockwise which cams stud 163 downward clockwise. Positioned astride the stud 163 is the bifurcated end of a link 186 (Fig. 10) which is one arm of a yoke 187 (Fig. 11) pivoted at 188 on a cross shaft of the machine. The other arm 189 of this yoke extends forwardly where it is positioned over a stud 190 (Fig. 1) on one arm 191 of a yoke pivoted at 192 to the machine side frame. The other arm 193 of the yoke projects upwardly in position to engage the rear end of slide 180. The arms 189 and 191 are held together by a spring 194. As the stud 163 moves downward clockwise, it rocks the yoke 187 (Fig. 11) clockwise which rocks the arm 189 (Fig. 1) clockwise.

This tensions the spring 194 which then tends to rock the yoke 191—193 clockwise to cause arm 193 to push the slide 180 forward. But, as the subtraction lever 12 is then in subtraction position where it engages the shoulder 185 of slide 180, the slide is held against movement and depression of the total and sub-total keys may take place. If, however, the subtract lever is subsequently moved forward to addition position, the spring 194 and yoke 191—193 move the slide 180 forward so that the latter moves into the notches in the total and sub-total keys to lock these keys against depression. Unless these is added into the register an amount or amounts sufficient to change the total from negative to positive again, the slide can be moved to release the total and sub-total keys only by moving the subtract lever to subtract position. When this occurs the subtract lever engages the shoulder 185 and moves the slide 180 rearwardly a short distance so that the notches 181 and 183 register with the stems of the total and sub-total keys.

In other words, when a negative total occurs, the slide 180 is positioned so that the total and sub-total keys are locked unless the subtract lever is in subtract position. If the subtract lever is in addition position, the operator, when he attempts to take a total, will find the total keys locked. He will then look to the subtract lever and, if it is in addition position, he knows that the total in the machine is negative, whereupon he moves the subtract lever to subtract position to release the keys. He can then depress the total key and take the total without any spacing stroke.

It is to be noted that the negative total lock is conditioned for effectiveness when a negative total occurs by reason of the movement of the "fugitive 1" mechanism. Since the "fugitive 1" is not inserted by the register exceeding its capacity, it follows that the negative total lock is not rendered effective when the register exceeds its capacity.

*True positive and negative totals—hand operated machine*

With the construction so far described, a true negative total may be taken by depressing the total or sub-total key and giving the machine a single stroke of operation, but, if the subtract lever happens to be in add position at the time an attempt is made to depress the total or sub-total key, the operator will find said keys locked and it is necessary for him to move the subtract lever to subtract position before he can depress said keys to get the negative total. As previously mentioned, it is sometimes desirable to have the operator thus notified when a negative total is in the machine, but, on the other hand, in some classes of work it is preferable to avoid having the operator go through the extra step of operation in shifting the subtract lever. Accordingly, a construction has been provided by means of which a true total can be taken, whether positive or negative, by simply depressing the total or sub-total key and giving the machine a stroke of operation. The operator need pay no attention whatever to whether the total is positive or negative and he need perform no other operation than depressing the total or sub-total key and giving the machine a stroke of operation.

Referring to Fig. 15 an arm 200 is pivoted to one of the side plates of the machine and urged clockwise by a spring 201. At its forward end this arm has two projections 202 and 203 positioned respectively under the stems of the total key T and the sub-total key ST. Mounted on the forward end of the arm 200 for a limited sliding movement is a slide plate 204 having an upper projection 205 to which a link 206 is connected. The latter is substituted for the negative total latch plate 180 heretofore described and it is connected at its rear end to the arm 193 of the bell crank 193—191. The other arm 191 of this lever is connected directly to the arm 189 of the negative total lever instead of being connected through a spring as heretofore described and as illustrated in Fig. 1. The slide plate 204 has a lower projection 207 which, when the machine is in normal addition condition, is positioned above a stud 208 on an irregular shaped slide plate 209 mounted on studs 210 and 211 on the side plate of the machine and urged upward by spring 212. This slide plate 209 has a rearward extending projection 213. The latter projection is positioned to engage a stud 214 on an extension 215 of the arm 50 whose function has heretofore been explained.

When the slide plate 204 is moved forward from the position of Fig. 15, its lower projection 207 is positioned over a stud 220 on a second irregular slide plate 221 mounted on studs 222 and 223 and urged upwardly by a spring 224. This second slide plate has a rearward projection 225 positioned to engage a stud 226 on an arm 227 of the yoke 55. These parts operate as follows:

Assume that there is a positive total in the machine and that the machine is in addition condition with the tumbling register frame 32 in addition position as shown in Fig. 5 and the other parts in the position illustrated in Fig. 15. Assume also that either the total or the sub-total key is depressed. The stem of the depressed key will rock the lever 200 downward and the lower projection 207 will engage the stud 208 and push the slide 209 downward, the slide 221 remaining stationary. The rear projection 213 of slide 209 is, at this time, considerably above the stud 214, as illustrated in Fig. 15 so that the downward movement of slide 209 does not affect the position of lever 50. Accordingly, register frame 32 is left in the addition position shown and a positive total may be taken in the regular manner.

It is to be observed that, if the register should exceed its capacity in a positive direction, the arm 186 and the slide 206 controlled by it are not moved, because arm 186 is not moved unless the "fugitive 1" segment is moved and the latter is not released by an "excess capacity" movement of the register. If the slide 206 were moved by the passing of the register pinion of highest order from its "9" to or through its "0" position, the projection 207 would be over the stud 220 and depression of the total key would position arm 50 to tumble the registers to subtract position. In other words, even though the register pinion of highest order controls the slide 206 so as to automatically position slide 204 when the register goes from positive to negative condition and vice versa, such action does not occur when the capacity of the register is exceeded in either direction after having once been conditioned for addition or subtraction.

Assume, however, that, with a positive total in the machine, the machine is in subtraction condition at the time the operator depresses the total or sub-total key. When the machine is in subtraction condition, the lever 50 will have been rocked clockwise from the position shown in Fig. 15 and the tumbling frame 32 will occupy its subtraction position which is counter-clockwise from the position of Fig. 15. The stud 214 on the extension 215 of arm 50 will be immediately below the projection 213 of slide 209 as shown in dotted lines in Fig. 15. When either the total or the sub-total key is depressed, the lever 200 swings downwardly and the lower projection 207 of slide plate 204 engages the stud 208 and pushes the irregular slide 209 downwardly. As the latter moves down, the projection 213 engages stud 214 and rocks the lever 50 counter-clockwise. This releases the latch 44 and positions the end of lever 50 in front of stud 42. Accordingly, as the register frame is rocked to move the register into engagement with the actuator racks the frame 32 will be tumbled clockwise to tumble the register mechanism to "add" position which is the correct position for taking a positive total.

Assume, next, that there is a negative total in the machine and that the register frame 32 is in its "add" position as illustrated in Fig. 15. When the negative total occurred the arm 189 was rocked clockwise as hereinbefore explained and the bell crank 191—193 was rocked counter-clockwise to move the slide 206 forward. The forward movement of slide plate 206 moves the projection 207 over the stud 220 on the slide plate 221. Now, when either the total or the sub-total key is depressed, the lever 200 is rocked downwardly and the projection 207 engages the stud 220 and moves the plate 221 downward against the tension of its spring 224. The slide plate 209 remains stationary. The rear extension 225 of slide 221 engages stud 226 and rocks the yoke 55 counter-clockwise. This rocks the arm 50 clockwise, releases the latch 45, and positions the end of arm 50 in front of the stud 43. Accordingly, as the register frame is rocked to move the registers into engagement with the actuator racks, the tumbling frame 32 is automatically tumbled to "subtract" position which is the correct position for taking a negative total.

Assume, next, that there is a negative total in the machine and the register frame 32 is in its "subtract" position. When the frame 32 is in subtract position the lever 50 occupies its lower position, that is, it is in a clockwise position from the showing of Fig. 15. This means that the stud 214 is immediately below the projection 213 of slide 209 and the stud 226 is considerably below the projection 225 of slide 221 as shown in dotted lines in Fig. 15. When either the total or the sub-total key is depressed, the lever 200 is rocked downwardly and the projection 207 engages the stud 220 to move the slide 221 downward against the tension of its spring 223. The projection 225 moves downwardly but, inasmuch as the stud 226 is considerably below the projection, the downward movement of the slide does not move the yoke 55 and the parts are left in the position they occupy, which is correct for the taking of a negative total inasmuch as the register frame 32 is already in subtract position.

From the above it will be seen that the operator need pay no attention to the condition of the machine when he takes a total. All that it is necessary to do is to depress the total or the sub-total key and give the machine one stroke of operation whereupon the correct total will be taken and printed no matter whether it is negative or positive. This makes the negative totaling operation very rapid and easy.

*Completely automatic true positive and negative totals*

The machine is made even more automatic both for addition and subtraction and for the taking of positive negative totals when the machine is motor driven. The construction for accomplishing this result is illustrated in Fig. 16.

The machine is provided with an "add" or (+) motor bar 230 having a stem 231 formed integral with a slide plate 209 similar to the slide plate 209 heretofore described. This plate has a rear projection 213 cooperating with the stud 214 on the arm 215 and it also carries a stud 208 with which the projection 207 cooperates.

The slide plate 209, in this case, is mounted on the stud 210 on the machine side plate and on a stud 232 on a slidable starting member 233. The member 233 is slidably mounted on the studs 210 and 211 and the stud and slot connection 232 is such that, when the slide plate 209 is moved downward, it carries the starting member 233 with it. The member 233 has a rearward projection 234 positioned over a stud 235 on a pivoted arm 236. This arm is connected by a spring 237 to an arm 238 fixed to a shaft 239, the arm 238 being urged counterclockwise by a spring 240. The latter extends through the machine and controls the starting switch and clutch for the electric motor drive, as shown in Patent No. 1,853,050. When the shaft 239 is rocked clockwise from the position of Fig. 16, the motor is started and the machine given a stroke of operation.

From the above it will be seen that when the add motor bar 230 is depressed the slide plate 209 is moved downwardly which carries the starting member 233 with it and operates the parts that cause the machine to be given a stroke of operation.

The machine is also provided with a "subtract" (—) motor bar 241 mounted on a stem 242 connected to a slide plate 221 similar to the plate 221 already described. This slide plate has a rearward projection 225 cooperating with the stud 226 and it also carries a stud 220 with which the projection 207 cooperates. The slide plate is mounted on a stud 222 on the side plate of the machine and on a stud 223 on the starting member 233, the stud and slot connection being such that when the slide 221 is moved downward, the starting member 233 is carried with it.

When the subtract motor bar 241 is depressed, the slide 221 is moved downwardly, the member 233 moves downward, the arms 236 and 238 are rocked clockwise and the machine given a stroke of operation.

When the add and subtract motor bars are used, it is not necessary to have the subtract lever 12 on the machine because addition or subtraction can be performed by simply depressing the proper motor bar.

For example, if the add motor bar is depressed, the slide 209 and the member 233 move downwardly. The downward movement of slide 209 causes projection 213 to move downward. If the register mechanism is in add position, as shown in Fig. 16, the lever 50 will be in the position there shown and the downward movement of projection 213 will not affect the position of lever 50 so that the registering mechanism remains in add position. If, however, the registering mechanism should be in subtract position, the lever 50 will be in a clockwise position from that illustrated in Fig. 16 and the stud 214 will be immediately below the propection 213. Now, when the slide 209 moves downwardly, the lever 50 is rocked counterclockwise to release the latch 44 and place the end of lever 50 in front of stud 42. As the machine is operated, the register frame 32 will be automatically rocked from subtract to add position to condition the machine properly to perform an addition operation.

The downward movement of the member 233 rocks the arms 236 and 238 clockwise and causes the motor to give the machine a stroke of operation so that the net result of depressing the addition bar is to automatically condition the parts for addition, if they happen to be in subtract position, and to automatically give the machine a stroke of operation.

If the subtract bar is depressed instead of the add bar, the slide 221 is moved downwardly and it carries the member 233 downward also to give the machine a stroke of operation. The downward movement of slide 221 moves the projection 225 downward. If the machine is in addition position as shown in Fig. 16 the projection 225 will engage stud 226 and rock the yoke 55 counterclockwise. This will swing the arm 50 clockwise to its lower position thereby releasing the latch 45 and placing the end of arm 50 in front of stud 43 so that, as the machine is operated, the register frame 32 is automatically tumbled to subtract position before the registers engage the actuator racks.

If, when the subtract bar 241 is depressed, the registering mechanism is in subtract position, the lever 50 will be in its lower position, that is, clockwise from the position of Fig. 16, and the stud 226 will be considerably below the projection 225, with the result that, when the subtract bar is depressed and the projection 225 moves downwardly, the stud 226 will not be engaged and the lever 50 will be allowed to remain in its position so that no change in the position of the register frame 32 is effected. In other words, it is left in its subtract position which is the position wanted.

From the above it will be clear that it is not necessary for the operator to manipulate a subtraction lever or depress a subtract key in the event he desires to perform subtraction. All that is necessary to do is to depress the subtract motor bar whereupon the machine will perform subtraction by a single stroke of operation that is given to it automatically by its motor drive. When addition is to be performed the operator depresses the add bar and the machine adds the items automatically by a single stroke and without requiring manipulation of any keys or levers to condition the machine for addition.

The taking of totals is likewise accomplished automatically in that it is merely necessary for the operator to depress the total or the sub-total key whereupon the machine will automatically take the total regardless of whether it is positive or negative. It is not necessary to move any subtraction lever or depress a motor bar. All that the operator does is to depress the total or the sub-total key depending upon whether he wants a total or a sub-total.

If there is a positive total in the machine, depression of the total or sub-total keys rocks the arm 200 downward which moves the projection 207 downward. Projection 207 engages the stud 208 and moves the slide 209 downward. If the registering mechanism is in addition condition, the controls are not changed but if it should happen to be in subtract condition, the lever 50 is automatically swung upward by the engagement of the projection 213 with the stud 214 so that as the registering mechanism is moved toward the actuator racks, the register frame 32 is automatically tumbled to add position. The downward movement of the slide 209 caused by depression of the total or sub-total key, moves the starting member 233 downwardly which rocks the arm 236 and 238 clockwise to cause the machine to be automatically given a stroke of operation by the motor drive.

If the total in the machine happens to be negative, the slide plate 209 will have been moved forward as heretofore explained so that the projection 207 is over the stud 220. Accordingly, when the total or sub-total key is depressed, the slide 221 is moved downward. If the registering mechanism happens to be in subtract position, the controls are not changed but, if it is in add position, the projection 225 on the slide 221 engages stud 226, rocks the yoke 55 counterclockwise, and moves the arm 50 downward so that latch 45 is released and the end of arm 50 is in front of stud 43. As the machine starts to operate, the register frame 32 is automatically tumbled to subtract position. The downward movement of slide 221 also moves the starting member 233 downwardly and the levers 236 and 238 are rocked clockwise to cause the machine to be automatically given a stroke of operation by its motor drive.

From the above it will be clear that either a positive or a true negative total may be taken from the machine by simply depressing the total key, or the sub-total key if a sub-total is desired, whereupon the machine will take the total automatically by a single stroke of operation. The operator need not depress a total key and a motor bar nor need he condition any part of the machine. Neither need the machine be given any spacing strokes.

The operation is much quicker and easier than the complicated mechanisms that have heretofore been devised for the taking of negative totals, all of which require some extra manipulation or some extra stroke of operation of the machine.

*Negative total signal for automatic negative total*

If desired, the completely automatic machine illustrated in Fig. 16 may be provided with a negative total signal in order to warn the operator that an overdraft exists. For this purpose there is provided a locking device that is illustrated in Figs. 16, 17, 18, and 19 which locks the total and subtotal keys against depression when there is a negative total in the machine, but which permits these keys to be depressed when the total is positive.

Referring to Fig. 16, there is slidably mounted on the underside of the top keyboard plate a slide plate 250 whose rear end is adjacent the upper arm 193 of the bell crank lever 191—193 that is rocked counterclockwise as heretofore explained when a negative total occurs. The slide plate 250 has a pair of notches 251 and 252 which, when there is a positive total in the machine, register with notches 253 (Fig. 17) in the stems of the total keys T and ST thereby permitting depression of either key. When an overdraft or a negative total occurs, the bell crank lever 191—193 rocks counterclockwise and moves the slide 250 forward so that a wide part of the slide enters the notches 253 in the total and sub-total key stems as illustrated in Fig. 18, thereby preventing depression of either key. Accordingly, if the operator attempts to take a total when there is a negative total in the machine he will find both the total and sub-total keys locked against depression which notifies him that an overdraft exists.

The total and sub-total keys are released by depressing a special release key 254 mounted on the keyboard adjacent the total and sub-total keys. The stem of this special key cooperates with the usual latch plate 255 so that, when the special key is depressed, it will be latched in depressed position. The same latch plate cooperates with the total and sub-total keys, the arrangement being of the flexible keyboard type, that is, if one of the keys is depressed, depression of another key in the same bank releases the depressed key. The special key is normally locked against depression by the slide 250 which enters a notch 256 in the stem of special key as shown in Fig. 19.

The slide 250 is provided with a lug 257 that projects rearwardly and downwardly as will be clear from Figs. 16 and 17. This lug is not normally in the path of the stem of the special key 254 but, when the slide 250 is moved forward, the lug moves into the notch 256 in the stem of the special key. If the special key is then depressed, the edge of its notch 256 will engage the inclined lug 257 and move the slide 250 farther forward to a position such that a second set of notches 258 and 259 in the slide 250 register with the stems of the total and sub-total keys thereby freeing these keys for depression. Inasmuch as the special key 254 is latched in its depressed position the slide 250 will, likewise, be held in the position to which it has been moved by the key 254 and the total and sub-total keys will be free for depression. When either of these keys is depressed, a true total will be automatically taken by a single stroke of operation of the machine initiated by depression of either of the keys.

When either the total or sub-total key is depressed, the usual key latch plate 255 that holds the special key 254 depressed is moved rearwardly to release the special key 254 which thereupon moves back to normal under the influence of its spring. The slide 250 cannot move rearward as long as either the total or sub-total keys are depressed but, when the totaling operation is completed, the depressed total or sub-total key is released whereupon the slide 250 is released and it then moves rearwardly a slight distance until blocked by the lever 193 in the position of Fig. 18. The total and sub-total keys are thus again locked against depression. This relocking of the total and sub-total keys continues after every totaling or sub-totaling operation until the negative total is converted to a positive total whereupon lever 193 is moved out of the path of slide 250 to permit it to move to the position of Fig. 17 to release the total and sub-total keys.

When this negative total signal is employed, it is, of course, necessary for the operator to depress the special release key before he can obtain a negative total and he is thus required to perform at least two operations before the total is obtained. But this signal is not always necessary and, where it is not employed, the negative total may be taken by simply depressing the total or sub-total key at any time a total is desired, whereupon the machine will operate automatically, and by a single stroke of operation, to print the true total no matter whether it is positive or negative.

I claim:

1. A calculating machine having actuator racks, a registering mechanism comprising a set of addition pinions intermeshing with a set of subtraction pinions, said pinions being mounted so that either set may be selectively tumbled to a position for cooperation with the actuator racks, a rocking frame in which said sets of pinions are mounted, means for rocking said frame to engage and disengage said pinions with said actuator racks, and means acting automatically to selectively tumble said registers as said registering mechanism is moved to engage the pinions with said actuator racks.

2. A calculating machine having differentially movable actuator racks, a registering mechanism having a set of addition and a set of subtraction pinions carried by a tumbling frame, means for moving said registering mechanism into and out of engagement with said racks, and a controlling member having connections by means of which it may be positioned from the keyboard of the machine so as to engage a portion of said tumbling frame as the registering mechanism is moved into engagement with said racks to thereby automatically tumble said register frame as an incident to the movement of the registering mechanism into engagement with said racks.

3. A calculating machine having differentially movable actuator racks, a registering mechanism having a set of addition and a set of subtraction pinions carried by a tumbling frame mounted in a movable register frame, means for moving said register frame to move said registering mechanism into and out of engagement with said actuator racks, latching mechanism for holding said tumbling frame in its position in said register frame, and a manually settable member movable to release said latching mechanism and to a position for engaging a portion of said tumbling frame as the register frame is moved to move the pinions into engagement with the actuator racks to thereby automatically tumble said tumbling frame as the registering mechanism is moved into engagement with said racks.

4. A calculating machine having actuator racks, a registering mechanism comprising a set of addition pinions meshing with a set of subtraction pinions, both of said sets of pinions being mounted in a tumbling frame, a rocking frame in which said tumbling frame is mounted, means for rocking said frame to engage and disengage said pinions and racks, means for conditioning the machine for addition or subtraction, and means set by said conditioning means acting to automatically engage a portion of said tumbling frame as said rocking frame is rocked to move the registering mechanism into engagement with said racks to rock thereby said tumbling frame to selectively position a set of pinions for cooperation with said racks corresponding to the setting of said conditioning means.

5. A calculating machine having actuator racks, a registering mechanism comprising a set of addition pinions meshing with a set of subtraction pinions, a tumbling frame in which said pinions are mounted, a rocking frame in which said tumbling frame is mounted, means for rocking said frame to engage and disengage said pinions with said actuator racks, a subtraction lever and connections for conditioning the machine for addition or subtraction, a pair of studs on said tumbling frame, a pair of latches for selectively engaging said studs, and a member settable by said subtraction lever to disengage said latches and to be positioned in front of one of said studs whereby, when said rocking frame is rocked to move the registers into engagement with said racks, the engagement of said stud with said member will automatically rock said tumbling frame to position the selected set of pinions for operation.

6. A calculating machine having a registering mechanism, means for changing said registering mechanism from addition to subtraction condition and vice versa, a "fugitive 1" mechanism urged in a direction to insert a "fugitive 1" in said registering mechanism, a latch for restraining said "fugitive 1" mechanism, a link operable to release said latch as an incident to changing the registering mechanism from addition to subtraction condition, means controlled by the pinion of highest order of said registering mechanism acting when the latter moves from positive to negative condition to disable said link and enable a second link which is operable as an incident to the changing of said registering mechanism from subtraction to addition condition to release said latch, a second latch for said "fugitive 1" mechanism, and means controlled by the pinion of highest order of said registering mechanism for releasing said second latch when said registering mechanism changes from positive to negative condition and vice versa, said registering mechanism controlled means acting to disable said second link and enable said first link when the registering mechanism changes from negative to positive condition.

7. A calculating machine having a motor operated driving means for giving the machine single cycles of operation in the same direction, differentially movable actuators, a registering mechanism, means for causing an engagement between said actuators and registering mechanism at the same time during a cycle of machine operation for both addition and subtraction, an addition motor bar, a subtraction motor bar, mechanism controlled by said motor bars acting when either of them is manipulated, to cause said motor driving means to give the machine a single cycle of operation, and selective means set by said motor bars when either is manipulated acting, as said machine is operated, to selectively determine, as an engagement is caused between said registering mechanism and actuators, whether said engagement shall be an addition or a subtraction engagement in accordance with whether the addition or the subtraction motor bar has been manipulated.

8. A calculating machine having means for giving the machine single cycles of operation, a differentially movable register-actuating means, a registering mechanism comprising a set of addition pinions interconnected with a set of subtraction pinions, said pinions being mounted so that either set may be engaged with said actuating means, means for moving the registering mechanism toward said actuators and into engagement with them at a given time during a cycle of operation of the machine, and control means acting automatically as said registering mechanism is moved toward said actuating means to selectively determine which of said set of pinions shall engage said actuating means.

9. A calculating machine having a motor operated driving means, differentially movable actuator racks, an addition-subtraction registering mechanism of the tumbling register type, means for moving said registering mechanism into and out of engagement with said actuator racks, an addition motor bar, a subtraction motor bar, and mechanism controlled by said motor bars acting, when one of said bars is manipulated, to cause said motor driving means to give the machine a cycle of operation and to cause said registering mechanism to be automatically tumbled to a position corresponding to the motor bar manipulated.

10. A calculating machine having a motor operated driving means for giving said machine cycles of operation, differentially movable actuator racks, an addition-subtraction registering mechanism, means for causing an engagement between said registering mechanism and racks at a certain time in the cycle of operation of said machine, said engagement being at the same time during each cycle for addition and for subtraction but in one relation for addition and another relation for subtraction, a settable member controlling the character of the engagement between said registering mechanism and racks and adapted to be positioned to determine whether said engagement shall be an addition or a subtraction engagement, an addition motor bar, a subtraction motor bar, and connections between said bars and said driving means to cause said driving means to give the machine a cycle of operation when one of said bars is manipulated, said connections including portions acting to position said member in a position corresponding to the motor bar manipulated to thereby cause the engagement between said registering mechanism and racks as the machine is operated to be automatically made to correspond to the manipulated motor bar.

11. A calculating machine having a motor operated driving means, differentially movable actuator racks, an addition-subtraction registering mechanism of the tumbling register type, means for moving said registering mechanism into and out of engagement with said actuator racks, mechanism adapted to be conditioned to cause said registering mechanism to be automatically tumbled as it is moved into engagement with said actuator racks, an addition motor bar, a subtraction motor bar, and connections controlled by said motor bars acting, when one of said bars is manipulated, to cause said motor driving means to give the machine a cycle of operation and to condition said register tumbling mechanism to cause said registering mechanism to be tumbled to a position corresponding to the motor bar manipulated in the event said registering mechanism does not already occupy a position corresponding to the manipulated motor bar.

12. A calculating machine having a motor operated driving means, differentially movable actuator racks, an addition-subtraction registering mechanism having sets of pinions mounted in a tumbling frame, means for moving said registering mechanism into and out of engagement with said racks, a member adapted to be positioned to engage portions of said tumbling frame to cause said frame to be automatically tumbled as the registering mechanism is moved into engagement with said racks, an addition motor bar, a subtraction motor bar, and connections between said motor bars and said driving means to cause said driving means to give the machine a cycle of operation when one of said motor bars is manipulated, said motor bar connections also including portions acting to set said member to positions corresponding to the motor bar manipulated so that said registering mechanism will be automatically tumbled to a position corresponding to the manipulated motor bar as said registering mechanism is moved into engagement with said actuator racks.

13. A calculating machine having differentially movable actuator racks, a registering mechanism of the tumbling register type, means acting automatically during an operation of the machine to move said registering mechanism into engagement with said racks for an addition or for a subtraction operation, controlling means for controlling the tumbled position of said registering mechanism, and means for holding all the pinions of said registering mechanism against rotation while said registering mechanism is being tumbled, said controlling means including portions acting automatically during the machine operation that causes said registering mechanism to engage said racks to automatically tumble said register to addition or subtraction position depending upon the addition or subtraction position of said controlling means.

14. A calculating machine having actuator racks, a registering mechanism of the tumbling type, said registering mechanism being capable of addition or subtraction and of accumulating positive or negative totals, means for moving the registering mechanism into and out of engagement with said racks, total taking means, and means controlled by the pinion of highest order of said registering mechanism and conditioned by said total taking means when the latter is conditioned for total taking acting to automatically tumble said registering mechanism to proper position as said registering mechanism is moved into engagement with said actuator racks in total taking whereby a positive or a true negative total may be taken from said registering mechanism by a single cycle of operation of said machine after conditioning the total taking means for total taking.

15. A calculating machine having actuator racks, a registering mechanism comprising a set of addition pinions meshing with a set of subtraction pinions, both said sets being carried by a tumbling frame, a rocking frame in which said tumbling frame is mounted, means for rocking said frame to engage said pinions with said actuator racks, total taking means, and means controlled by the pinion of highest order of said registering mechanism and conditioned by said total taking means when the latter is conditioned for total taking including a member positioned to engage a portion of said tumbling frame as said rocking frame is rocked to engage the registering mechanism with said racks whereby a positive or a true negative total may be taken from said registering mechanism by a single cycle of operation after conditioning said total taking means for total taking.

16. A calculating machine having actuator racks, a registering mechanism of the tumbling type, means for tumbling said register to addition or subtraction position, a total taking means including a depressible total key, mechanism normally conditioned by depression of said total key for causing said registering mechanism to be tumbled to addition position if not in said position, means controlled by the pinion of highest order of said registering mechanism when said mechanism changes from positive to negative condition for conditioning said total key controlled mechanism to cause said registering mechanism to be tumbled to subtraction position, and means controlled as an incident to the tumbling of said registering mechanism for preventing said total key controlled mechanism from being conditioned for subtraction when said register pinion moves directly from its "9" to or through its "0" position while said register is in addition position.

17. A calculating machine having a motor operated driving means, a registering mechanism capable of addition or subtraction whereby it may reach either a positive or a negative condition, an addition motor control mechanism for causing the motor drive to give the machine a cycle of operation and for conditioning the registering mechanism for addition, a subtraction motor control mechanism for causing the motor drive to give the machine a cycle of operation and for conditioning the registering mechanism for subtraction, a total-taking means, and mechanism associated with said total-taking means and said motor control mechanisms and controlled by said registering mechanism whereby, when said registering mechanism is in positive condition, said total-taking means, when manipulated, will operate said addition motor control mechanism and, when said registering mechanism is in negative condition, said total-taking means, when manipulated, will operate said subtraction motor control mechanism.

18. A calculating machine having a motor operated driving means, a registering mechanism capable of addition or subtraction whereby the same may reach a positive or a negative condition, an addition motor bar mechanism acting, when manipulated, to cause the machine to perform an addition operation, a subtraction motor bar mechanism acting, when manipulated, to cause the motor drive to give the machine a subtraction operation, a total-taking means, and mechanism associated with said total-taking means and said motor bar mechanisms and controlled by said registering mechanism so that, when the registering mechanism is in positive condition, said addition motor bar mechanism is placed under the control of said total-taking means and, when said registering mechanism is in negative condition, said subtraction motor bar mechanism is placed under the control of said total-taking means.

19. A calculating machine having a motor operated driving means, a registering mechanism capable of addition or subtraction whereby the same may reach a positive or negative condition, an addition motor control mechanism for causing said motor drive to give the machine an addition operation, a subtraction motor control mechanism for causing said motor drive to give the machine a subtraction operation, a total-taking means, and mechanism controlled by the pinion of highest order of said registering mechanism for placing said total-taking means in control of the addition motor control mechanism when said register is in positive condition and for placing said total-taking means in control of said subtraction motor control mechanism when said register is in negative condition.

20. A calculating machine having a motor driving means, a registering mechanism capable of addition or subtraction whereby the same may reach a positive or a negative condition, an addition motor bar mechanism acting, when manipulated, to cause the motor drive to give the machine an addition operation, a subtraction motor bar mechanism acting, when manipulated, to cause the motor drive to give the machine a subtraction operation, a depressible total key, and mechanism movable by depression of said total key for operating said motor bar mechanisms, said total key mechanism including a movable member controlled by the pinion of highest order of said registering mechanism whereby, when said registering mechanism is in positive condition, depression of said total key will operate said addition motor bar mechanism and when said register is in negative condition, depression of said total key will operate said subtraction motor bar mechanism.

21. A calculating machine having a motor operated driving means, a registering mechanism adapted to be placed in additive condition for performing addition and the taking of a positive total and in subtractive condition for performing subtraction and the taking of negative totals, an addition motor control mechanism for placing the machine in additive condition and causing an operation thereof, a subtraction motor control mechanism for placing the machine in subtractive condition and causing an operation thereof, a total taking means, mechanism controlled by the pinion of highest order of said registering mechanism for placing said total taking means in control of said subtraction motor control mechanism when said pinion of highest order moves directly from its "0" to or through its "9" position, and means preventing said total taking means from being placed in control of said subtraction motor control mechanism when said pinion moves directly from its "9" to or through its "0" position by reason of the capacity of the register being exceeded in a positive direction.

22. A calculating machine having a motor operated driving means, a registering mechanism capable of addition or subtraction and of accumulating positive or negative totals, an addition control mechanism for causing said motor drive to give said machine an addition operation, a subtraction control mechanism for causing said motor drive to give said machine a subtractive operation, a total taking means normally in control of said addition control mechanism, a "fugitive 1" mechanism for inserting a "fugitive 1" in said registering mechanism when the latter changes from positive to negative condition, and means actuated by said "fugitive 1" mechanism for placing said total taking means in control of said subtraction control mechanism when the registering mechanism goes from positive to negative condition.

23. A calculating machine having a registering mechanism capable of both addition and subtraction and of accumulating positive or negative totals, addition-subtraction controlling means for conditioning the machine for addition or subtraction, printing mechanism, a "fugitive 1" mechanism for inserting a "fugitive 1" in said registering mechanism to place the same in correct numerical condition for the taking of a positive or a negative total, means settable by a single manipulative member which is free at all times while the machine is not being operated to condition said machine to take directly from said registering mechanism and print the exact total in said registering mechanism, a positive total being taken with the machine in addition condition and a true negative total being taken with the machine in subtraction condition, and means governed by said registering mechanism in accordance with whether it is in positive or negative condition for placing said total-taking means in control of said addition-subtraction controlling means whereby, when said machine is conditioned for total-taking by said single member and operated, a positive or a true negative total will be taken in accordance with the character of the total in said registering mechanism.

24. A calculating machine having means for giving it single cycles of operation, a differentially movable register-actuating means, a registering mechanism capable of accumulating positive or negative totals, means for causing an engagement between said registering mechanism and actuating means in one relation and at a given time during a cycle of machine operation to take a positive total and to cause an engagement in another relation at the same time during a cycle of machine operation to take a negative total, and settable total taking means controlled by said registering mechanism acting automatically when set to selectively determine the relation of the engagement between said registering mechanism and racks as a relative movement between said actuators and registering mechanism occurs to cause an engagement.

25. A calculating machine adapted to be given cycles of operation and having actuator racks and a registering mechanism adapted to engage each other in one relation for addition and the taking of positive totals and in another relation for subtraction and the taking of negative totals, means for causing an engagement between said registering mechanism and racks, total taking means, means controlled by said registering mechanism and conditioned by said total taking means when the latter is conditioned for total taking acting to automatically determine the relation of the engagement between said registering mechanism and racks as said registering mechanism and racks are moved relative to one another to cause such engagement, whereby a positive or a true negative total may be taken from said registering mechanism by a single cycle of machine operation immediately following an item entering cycle of machine operation.

26. A calculating machine adapted to be given cycles of operation, actuator racks and a registering mechanism adapted to engage one another in one relation for addition and the taking of positive totals and in another relation for subtraction and the taking of negative totals, total taking means settable to condition said machine to take a total from said registering mechanism directly, said total taking means being free to be conditioned for total taking immediately after each cycle of machine operation and when the total in said registering mechanism is either positive or negative, and means governed by said registering mechanism in accordance with its positive or negative condition acting when the machine is conditioned for total taking to automatically control the addition-subtraction relation of the engagement between said registering mechanism and racks as a relative movement between said racks and registering mechanism occurs to cause an engagement to thereby enable the machine to take a true positive or a true negative total from said registering mechanism by a single cycle of machine operation immediately following an item entering cycle of machine operation.

27. A calculating machine having a motor operated driving means, a registering mechanism capable of addition or subtraction and of accumulating positive or negative totals, a printing mechanism operable to print the exact total in said registering mechanism, a "fugitive 1" mechanism operable to insert a "fugitive 1" in said registering mechanism, total taking means settable by a single depressible total key for the direct taking of either a positive or true negative total from said registering mechanism, means conditioned by depression of said total key for causing said motor driving means to give said machine a cycle of operation, and means controlled by said registering mechanism in accordance with its positive or negative condition acting to place the control of the addition-subtraction relation of said registering mechanism under the control of said total key whereby, when said total key is depressed, said machine will be given a cycle of operation and caused to automatically take either a positive or a true negative total depending upon the character of the total in said registering mechanism.

THOMAS M. BUTLER.